US012632067B2

(12) United States Patent
Wei et al.

(10) Patent No.: US 12,632,067 B2
(45) Date of Patent: May 19, 2026

(54) THRESHOLD-TYPE OBSTACLE RECOGNITION

(71) Applicant: Anker Innovations Technology Co., Ltd., Changsha (CN)

(72) Inventors: Haotian Wei, Shenzhen (CN); Yixin Xu, Shenzhen (CN); Zhaoqin Guo, Shenzhen (CN); Caokai Yu, Shenzhen (CN)

(73) Assignee: Anker Innovations Technology Co., Ltd., Changsha (CN)

( * ) Notice: Subject to any disclaimer, the term of this patent is extended or adjusted under 35 U.S.C. 154(b) by 36 days.

(21) Appl. No.: 18/755,010

(22) Filed: Jun. 26, 2024

(65) Prior Publication Data

US 2025/0076890 A1      Mar. 6, 2025

(30) Foreign Application Priority Data

Jun. 29, 2023    (CN) .......................... 202310787409.1
Jul. 14, 2023    (CN) .......................... 202310872625.6

(51) Int. Cl.
G05D 1/622          (2024.01)
G01S 17/89          (2020.01)
              (Continued)

(52) U.S. Cl.
CPC .............. G05D 1/622 (2024.01); G01S 17/89 (2013.01); G01S 17/931 (2020.01); G05D 1/65 (2024.01);
              (Continued)

(58) Field of Classification Search
CPC ...... G05D 1/622; G05D 1/65; G05D 2111/17; G05D 2111/52; G01S 17/931; G01S 17/89; G06F 18/23
See application file for complete search history.

(56) References Cited

U.S. PATENT DOCUMENTS 8,862,271 B2 *  10/2014  Shamlian ............. G05D 1/0227
                                                    700/254
10,762,331 B1 *  9/2020  Zhang .................... G06V 20/64
                        (Continued)

FOREIGN PATENT DOCUMENTS

CN        112699734 A      4/2021
CN        114299392 A      4/2022
CN        115993814 A      4/2023

OTHER PUBLICATIONS

Oct. 21, 2024—(EP) Search EP24184980.

*Primary Examiner* — Courtney D Heinle

(74) *Attorney, Agent, or Firm* — Banner & Witcoff, Ltd.

(57)                ABSTRACT

The present application relates to a threshold-type obstacle recognition method, an orientation recognition method of a threshold-type obstacle, and a robot control method. With the robot control method of the present application, using the recognition results of the threshold-type obstacle and the recognition results of the orientation of the threshold-type obstacle, a corresponding operation of passing through the threshold obstacle is matched according to the relative relationship between a direction of travel of the robot and the orientation of the threshold-type obstacle, and the orientation of the threshold-type obstacle is used as a guide to provide the robot with a matching operation of passing through the threshold-type obstacle, so as to improve the success rate of the robot passing through the threshold-type obstacle.

20 Claims, 21 Drawing Sheets

(51) Int. Cl.
| | |
|---|---|
| *G01S 17/931* | (2020.01) |
| *G05D 1/65* | (2024.01) |
| *G05D 111/10* | (2024.01) |
| *G05D 111/50* | (2024.01) |
| *G06F 18/23* | (2023.01) |

(52) U.S. Cl.
CPC .......... *G06F 18/23* (2023.01); *G05D 2111/17* (2024.01); *G05D 2111/52* (2024.01)

(56) References Cited

U.S. PATENT DOCUMENTS

| | | | | |
|---|---|---|---|---|
| 2018/0341019 A1* | 11/2018 | Sakai | ..................... | G01S 7/003 |
| 2019/0180467 A1* | 6/2019 | Li | ........................... | G01S 17/93 |
| 2021/0192788 A1* | 6/2021 | Diederichs | ............ | G01S 17/931 |
| 2022/0044410 A1* | 2/2022 | Wu | ......................... | G06T 7/162 |
| 2022/0107391 A1* | 4/2022 | Ren | ........................ | G06V 20/58 |
| 2023/0305573 A1* | 9/2023 | Xie | ............................ | G06T 7/50 |
| 2023/0342954 A1* | 10/2023 | Liang | ..................... | G06T 7/246 |
| 2024/0288547 A1* | 8/2024 | Yomo | .................... | G01S 7/415 |
| 2024/0369708 A1* | 11/2024 | Crouch | ................ | G01S 7/4816 |

* cited by examiner

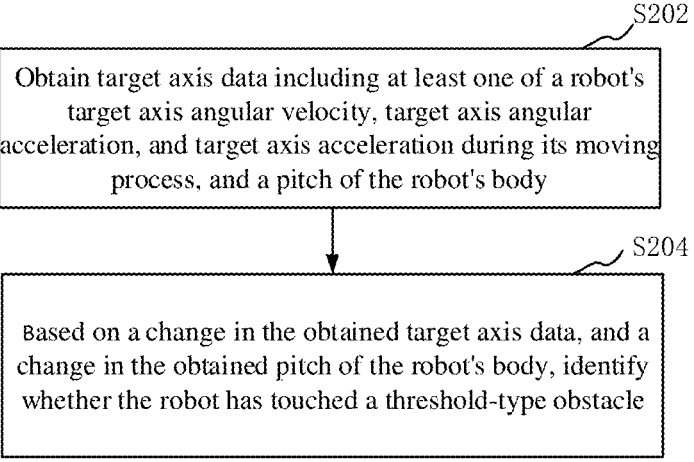

S202

Obtain target axis data including at least one of a robot's target axis angular velocity, target axis angular acceleration, and target axis acceleration during its moving process, and a pitch of the robot's body

S204

Based on a change in the obtained target axis data, and a change in the obtained pitch of the robot's body, identify whether the robot has touched a threshold-type obstacle

FIG. 2

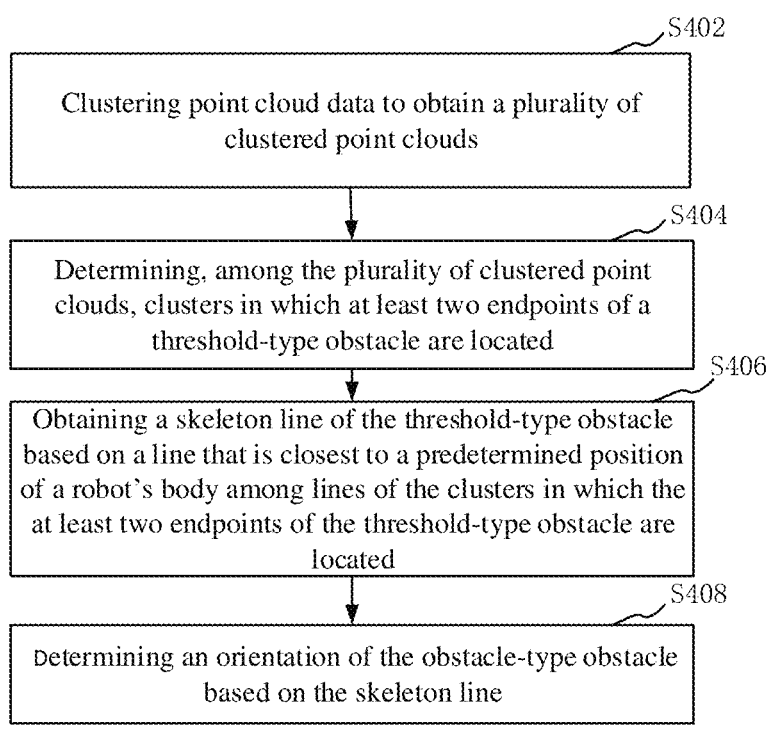

S402

Clustering point cloud data to obtain a plurality of
clustered point clouds

S404

Determining, among the plurality of clustered point
clouds, clusters in which at least two endpoints of a
threshold-type obstacle are located

S406

Obtaining a skeleton line of the threshold-type obstacle
based on a line that is closest to a predetermined position
of a robot's body among lines of the clusters in which the
at least two endpoints of the threshold-type obstacle are
located

S408

Determining an orientation of the obstacle-type obstacle
based on the skeleton line

FIG. 5

Connection laser point cloud

THRESHOLD-TYPE OBSTACLE RECOGNITION

The present application claims priority to CN Application No. 202310787409.1, filed on Jun. 29, 2023 and CN Application No. 202310872625.6, filed on Jul. 14, 2023. The above application is incorporated by reference in its entirety.

FIELD

This application relates to the field of robotics, particularly to a method for recognizing threshold-type obstacles and identifying orientations of threshold-type obstacles, and a robot control method.

BACKGROUND

With the development of robot technology, robots have greatly facilitated people's lives. Robots often encounter various types of obstacles during their movement, among which threshold-type obstacles are common. Conventional robots face a low success rate when navigating these threshold-type obstacles.

SUMMARY

The present disclosure addresses the aforementioned technical issues by providing a method for recognizing threshold-type obstacles that improves the accuracy of identification, a robotic control method for identifying the orientations of threshold-type obstacles that can improve the accuracy of identification, a robotic control method that can improve the success rate of passing through threshold-type obstacles, as well as a robot and a computer-readable storage medium.

First aspect, this application provides a method for identifying or recognizing threshold-type obstacles, wherein the method comprises:

Obtaining target axis data including at least one of a robot's target axis angular velocity, target axis angular acceleration, and target axis acceleration during its movement process, as well as a pitch of a body of the robot;

Based on a change in the obtained target axis data, as well as a change in the obtained pitch of the body of the robot, identifying whether the robot has encountered a threshold-type obstacle.

Second aspect, this application provides a method for identifying or recognizing the orientation of threshold-type obstacles, the method comprises:

Clustering based on collected point cloud data to obtain multiple clustered point clouds;

Determining one or more clusters that contain at least two endpoints of the threshold-type obstacle among the multiple clustered point clouds;

Determining, in the one or more clusters, a plurality of lines connecting the at least two endpoints of the threshold-type obstacle;

Based on that a line, from the plurality of lines, that is closest (e.g., nearest) to a predetermined position of a body of a robot, a generating the skeleton line of the threshold-type obstacle;

Determining the orientation of the threshold-type obstacle based on its skeleton line.

Third aspect, this application provides a robot control method, wherein the method comprises:

Triggering a pass-through threshold-type obstacle command to pass through a threshold-type obstacle based on a recognition result of the threshold-type obstacle;

In response to the command to pass through the threshold-type obstacle, obtaining the orientation of the threshold-type obstacle;

Acquiring the relative relationship between the robot's direction of travel and the orientation of the threshold-type obstacle;

Controlling the robot to pass through the threshold-type obstacle in a manner corresponding to the relative relationship.

Fourth aspect, this application provides a robot, including a memory and a processor, where the memory stores a computer program, and the processor implements the steps of the methods described in the above examples when executing the computer program.

Fifth aspect, this application provides a computer-readable storage medium, which stores a computer program, when executed by a processor, the computer program implements the steps of the methods of the above examples.

Sixth aspect, this application provides a computer program product, including a computer program, which, when executed by a processor, implements the steps of the methods of the above examples.

The threshold-type obstacle identification method of this application, by integrating the changes in the target axis data including at least one of the target axis angular velocity, target axis angular acceleration, and target axis acceleration, as well as the change in the pitch of the body of the robot for obstacle identification, enriches the sources of information for threshold-type obstacle identification, which can avoid misidentification caused by single-dimensional data, and improves the accuracy of threshold-type obstacle identification.

The orientation recognition method for threshold-type obstacles in this application is based on clustering the collected point cloud data. According to the clustering results, the clusters where the endpoints of the threshold-type obstacles are located is determined. Based on the lines connecting the closest points to the robot's preset position within the cluster containing the threshold-type obstacle endpoints, the skeleton line of the threshold-type obstacle is obtained. The orientation of the threshold-type obstacle is determined based on its skeleton line. This method uses point cloud data to identify the threshold line, taking into account the relationship between the skeleton line of the threshold-type obstacle and the robot's preset position. Recognizing the orientation of the threshold-type obstacle based on its skeleton line can improve the accuracy of the orientation recognition of the threshold-type obstacle.

The robot control method of this application utilizes the threshold recognition results and the orientation recognition results of the threshold-type obstacles. Based on the relative relationship between the robot's travel direction and the orientation of the threshold-type obstacle, a corresponding threshold-type obstacle crossing method is matched. This method can guide the robot to pass through threshold-type obstacles by using the orientation of the threshold-type obstacles as a guide, providing a matching method for the robot to pass through the threshold-type obstacles, thereby improving the success rate of the robot passing through the threshold-type obstacles.

BRIEF DESCRIPTION OF THE DRAWINGS

FIG. 2 is a flowchart illustrating a method for recognizing threshold-type obstacles in an example;

FIG. 5 is a flowchart illustrating a method for recognizing an orientation of threshold-type obstacles in an example;

BRIEF DESCRIPTION

To make the objectives, technical solutions, and advantages of this application clearer and more comprehensible, the following detailed description of the application is provided in conjunction with the accompanying drawings and examples. It should be understood that the specific examples described here are only used to explain this application and are not intended to limit the scope of this application.

Figure 1:
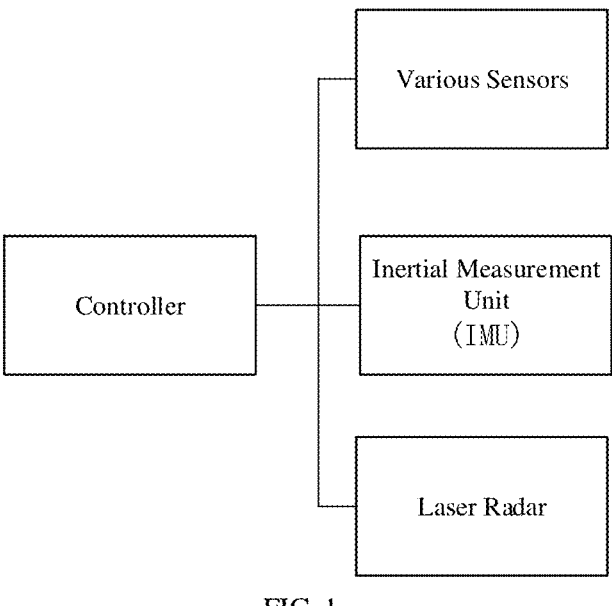
FIG. 1 is a structural block diagram of a sensing part of a robot in an example.

An example of this application provides a robot, as shown in FIG. 1, whose sensing part comprises:

A controller, an IMU (Inertial Measurement Unit), a laser radar, and various sensors. The IMU, laser radar, and various sensors are all signal-connected to the controller. The various sensors include, but are not limited to, vision sensors, infrared sensors, collision sensors, ultrasonic sensors, wall-following sensors, cliff sensors, and fall protection sensors, etc.

The IMU, laser radar, and various sensors collect information and send it to the controller, which makes decisions based on the collected information. Decisions may include navigation, obstacle avoidance, and control.

The robots in this application include, but are not limited to, cleaning robots, food delivery robots, and logistics robots. During actual operation, robots may encounter obstacles. Different operating modes can be adopted to safely pass different obstacles. Threshold-type obstacles are one type of obstacle, and to improve the accuracy of passing threshold-type obstacles, this application provides a threshold-type obstacle recognition method, a threshold-type obstacle orientation recognition method, and a robot control method.

Traditional robots, when recognizing threshold-type obstacles, usually make judgments based on the tilt angle of the IMU. When there is a significant change in the tilt angle, it can be determined that the robot has touched a threshold-type obstacle. However, using the tilt angle can easily misidentify objects such as slopes and carpets as threshold-type obstacles. The threshold-type obstacle recognition method of this application identifies whether the robot has touched a threshold-type obstacle based on changes in target axis data including at least one of the target axis angular velocity, target axis angular acceleration, and target axis acceleration, as well as changes in the pitch of the robot's body, where a target axis is the rotation axis of the pitch. This method reduces the false detection rate of threshold-type obstacles by fusing changes in target axis data including at least one of the target axis angular velocity, target axis angular acceleration, and target axis acceleration, as well as changes in the pitch of the robot's body.

The threshold-type obstacle orientation recognition method of this application clusters the collected point cloud data to determine the skeleton line of the threshold-type obstacle and then determines the orientation of the threshold-type obstacle based on its skeleton line. This method can quickly determine the orientation of threshold-type obstacles, improving the detection efficiency of the orientation of threshold-type obstacles.

The robot control method of this application triggers a command to pass through threshold-type obstacles based on the recognition results of the threshold-type obstacles; responds to the command to pass through threshold-type obstacles, obtains the relative relationship between the robot's traveling direction and the orientation of the threshold-type obstacles; and controls the robot to pass through the threshold-type obstacles using the corresponding passing method based on the relative relationship. When the robot passes through threshold-type obstacles, considering the relative relationship between the orientation of the threshold-type obstacles and the robot's traveling direction provides a reference for determining the method of passing through threshold-type obstacles, which can improve the success rate of the robot passing through threshold-type obstacles.

In an example, as shown in FIG. 2, a threshold-type obstacle recognition method is provided. This method is illustrated by applying it to the controller in FIG. 1 and includes the following steps:

Step 202, obtain target axis data including at least one of the robot's target axis angular velocity, target axis angular acceleration, and target axis acceleration during the its moving process, as well as a pitch of the robot's body. The target axis is the rotation axis for the pitch.

The robot's target axis data including target axis angular velocity, target axis angular acceleration, and target axis acceleration, as well as pitch of the robot's body, can be detected by the robot's sensors. For example, they can be detected by the robot's Inertial Measurement Unit (IMU).

Figure 3:
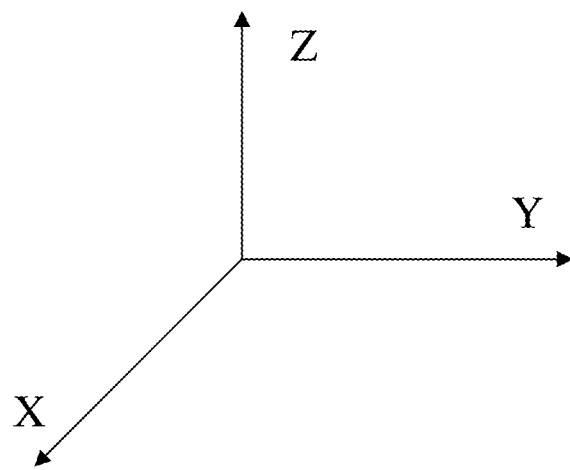
FIG. 3 is a schematic diagram of a carrier coordinate system in an example.

The coordinate system of the robot's sensors is shown in FIG. 3, which has an X-axis, Y-axis, and Z-axis. When viewed from behind the robot, the Z-axis is usually set to face upwards. In one example, the X-axis can be set to face the front of the robot, and the Y-axis can be set to face the left side of the robot. At this time, the Y-axis is the rotation axis for the pitch, and the target axis is the Y-axis.

In another example, when viewed from behind the robot, the X-axis can be set to face the right side of the robot, and the Y-axis can be set to face the front of the robot. At this time, the X-axis is the rotation axis for the pitch, and the target axis is the X-axis. Specifically, the IMU is a device that measures the three-axis attitude angles and acceleration of an object. A typical IMU includes a three-axis gyroscope and a three-axis accelerometer, and some 9-axis IMUs also include a three-axis magnetometer. The accelerometer detects the acceleration signals of the object along three independent axes in the carrier coordinate system, while the gyroscope detects the angular velocity signals of the carrier relative to the navigation coordinate system, measuring the object's angular velocity and acceleration in three-dimensional space.

When the robot encounters scenarios such as collisions or in-place rotations, target axis data including at least one of the target axis angular velocity, target axis angular acceleration, and target axis acceleration will undergo a sudden change.

The pitch refers to the angle of rotation around the target axis among the attitude angles. The pitch of the robot's body can be determined by integrating the target axis angular velocity calculated by the IMU. When the robot walks or moves on surfaces with height differences, such as climbing slopes or passing through thresholds, the pitch will undergo significant changes.

Step 204, based on the changes in target axis data including at least one of the target axis angular velocity, target axis angular acceleration, and target axis acceleration, as well as the changes in the robot's body pitch, identify whether the robot has touched a threshold-type obstacle.

Threshold-type obstacles are objects that protrude from the ground and present a threshold shape, posing obstacles to the robot's movement. Threshold-type obstacles can include threshold strips, threshold blocks, etc. Common threshold-type obstacles in daily life include door thresholds, connecting parts of table and chair legs on the ground, connecting parts of bed legs on the ground, block-shaped obstacles protruding from the ground, and strip-shaped obstacles protruding from the ground. Because threshold-type obstacles usually appear as threshold strips or blocks with a small height protruding from the ground, the robot can pass over these obstacles by acceleration.

One implementation is to identify whether the robot has touched a threshold-type obstacle based on the changes in the target axis angular velocity and the robot's body pitch. If both the target axis angular velocity and the pitch of the robot's body undergo significant changes within a short period during the robot's moving process, it can be determined that the robot has touched a threshold-type obstacle.

Another implementation is to identify whether the robot has touched a threshold-type obstacle based on the changes in the target axis acceleration and the pitch of the robot's body. If both the target axis acceleration and the pitch of the robot's body undergo significant changes within a short period during the robot's moving process, it can be determined that the robot has touched a threshold-type obstacle.

Another implementation is to identify whether the robot has touched a threshold-type obstacle based on the changes in the target axis angular acceleration and the pitch of the robot's body. If both the target axis angular acceleration and the pitch of the robot's body pitch undergo significant changes within a short period during the robot's moving process, it can be determined that the robot has touched a threshold-type obstacle.

Another implementation is to identify whether the robot has touched a threshold-type obstacle based on the changes in the target axis angular velocity, target axis angular acceleration, and the pitch of the robot's body. If the target axis angular velocity, target axis angular acceleration, and the pitch of the robot's body all undergo significant changes within a short period during the robot's moving process, it can be determined that the robot has touched a threshold-type obstacle.

Another implementation is to identify whether the robot has touched a threshold-type obstacle based on the changes in the target axis angular velocity, target axis acceleration, and the robot's body pitch. If the target axis angular velocity, target axis angular acceleration, and the robot's body pitch all undergo significant changes within a short period during the robot's moving process, it can be determined that the robot has touched a threshold-type obstacle.

One example involves identifying whether a robot has come into contact with threshold-type obstacles based on changes in the target axis angular velocity, target axis acceleration, target axis angular acceleration, and the pitch of the robot's body. If the target axis angular velocity, target axis angular acceleration, and the pitch of the robot's body all undergo significant changes within a short period, it can be determined that the robot has encountered a threshold-type obstacle.

Compared to the method of identifying threshold-type obstacles based solely on target axis angular velocity and angular acceleration, recognizing threshold-type obstacles based on target axis data including at least one of the changes in the target axis angular velocity, target axis angular acceleration, and target axis acceleration during the robot's movement, as well as the change in the pitch of the robot's body, can avoid false detection of threshold-type obstacles due to actions that cause sudden changes in angular velocity, such as collisions and on-the-spot rotations. Compared to the method of identifying threshold-type obstacles based on the pitch of the robot's body, recognizing threshold-type obstacles based on target axis data including at least one of the changes in the target axis angular velocity, target axis angular acceleration, and target axis acceleration during the robot's movement, as well as the change in the pitch of the robot's body, can avoid false detection of threshold-type obstacles due to an increase in the pitch when climbing slopes. In this example, by integrating multiple data detection results such as the target axis angular velocity, target axis acceleration, target axis angular acceleration, and the pitch of the robot's body, the robustness of the threshold-type obstacle detection is enhanced.

This method enriches the information sources for threshold-type obstacle recognition by integrating changes in target axis data including at least one of the target axis angular velocity, target axis angular acceleration, and target axis acceleration, as well as the change in the pitch of the robot's body. It can avoid misidentification caused by single-dimensional data and improve the accuracy of threshold-type obstacle recognition.

In another example, identifying whether a robot has come into contact with threshold-type obstacles based on changes in target axis data including at least one of the target axis angular velocity, target axis angular acceleration, and target axis acceleration, as well as the change in the pitch of the robot's body, includes: when target axis data including at least one of the target axis angular velocity, target axis angular acceleration, and target axis acceleration, as well as the pitch of the robot's body, reach their respective threshold recognition values for threshold-type obstacle recognition within a preset time, it is determined that the robot has encountered a threshold-type obstacle.

Here, the threshold recognition values are critical values used to determine whether a threshold-type obstacle has been recognized. It is understood that for the four parameters of target axis angular velocity, target axis acceleration, target axis angular acceleration, and the pitch of the robot's body, corresponding threshold recognition values are set. That is, the threshold recognition values include those for target axis angular velocity, target axis acceleration, target axis angular acceleration, and the pitch of the robot's body.

In one example with the sensor setup, when observed from behind the robot, the X-axis is set to face the front of the robot, and the Y-axis is set to face the left side of the robot. At this time, the Y-axis is the rotation axis for the pitch, and the target axis is the Y-axis. When the robot's omnidirectional wheel front wheel climbs over a threshold-type obstacle, the body tilts, the target axis angular velocity is negative, the target axis angular acceleration is negative, the target axis acceleration is negative, and the pitch is negative.

Under this setup, in one example, the target axis angular velocity and the pitch of the robot's body must simultaneously, or nearly simultaneously, be less than or equal to their respective recognition thresholds to determine that the robot has encountered a threshold-type obstacle. This also corresponds to the actual application scenarios of the robot. In one example, a preset time can be set to, for example, one second, and when both the target axis angular velocity and the pitch of the robot's body are less than or equal to their respective recognition thresholds within one second, it is determined that the robot has encountered a threshold-type obstacle.

In one example, the target axis acceleration and the pitch of the robot's body must simultaneously, or nearly simultaneously, be less than or equal to their respective recognition thresholds to determine that the robot has encountered a threshold-type obstacle. This also corresponds to the actual application scenarios of the robot. In one example, the preset time can be set to one second, and when both the target axis acceleration and the pitch of the robot's body are less than or equal to their respective recognition thresholds within one second, it is determined that the robot has encountered a threshold-type obstacle.

In one example, the target axis angular acceleration, and the pitch of the robot body need to be simultaneously, or nearly simultaneously, less than or equal to the corresponding identification threshold before determining that the robot has touched the threshold-type obstacle. In one example, the preset time can be set to one second, and when the target axis angular acceleration and the robot body pitch are both less than or equal to the corresponding recognition threshold value within one second, it is determined that the robot has touched the threshold-type obstacle.

In one example, the target axis angular velocity, the target axis angular acceleration, and the pitch of the robot's body need to be simultaneously, or nearly simultaneously, less than or equal to the corresponding threshold identification threshold before the robot is judged to have touched the threshold-type obstacle. In one example, the preset time may be set to one second, and when the target axis angular velocity, the target axis angular acceleration, and the pitch of the robot's body are all less than or equal to the corresponding threshold recognition value within one second, it is determined that the robot has touched the threshold-type obstacle.

In one example the target axis angular velocity, the target axis acceleration, and the pitch of the robot's body need to be simultaneously, or nearly simultaneously, less than or equal to the corresponding threshold recognition value before the robot is judged to have touched the threshold-type obstacle. In one example, the preset time may be set to one second, and when the target axis angular velocity, the target axis acceleration, and the pitch of the robot's body are all less than or equal to the corresponding threshold recognition value within one second, it is determined that the robot has touched the threshold-type obstacle.

In one example, the target axis angular velocity, the target axis acceleration, the target axis angular acceleration, and the pitch of the robot body need to be simultaneously, or nearly simultaneously, less than or equal to the corresponding threshold identification threshold before the robot is judged to have touched the threshold-type obstacle. In one example, the preset time may be set to one second, and when the target axis angular velocity, the target axis acceleration, the target axis angular acceleration, and the pitch of the robot's body are all less than or equal to the corresponding threshold identification threshold value within one second, it is determined that the robot has touched the threshold-type obstacle.

In one example, depending on the sensor setting, the X-axis may be set to the right side toward the robot and the Y-axis may be set to the front toward the robot when viewed from the rear of the robot. In this case, the X-axis is the rotation axis of the pitch and the target axis is the X-axis. When the robot's front wheel climbs a sill obstacle (e.g., a sill-type obstacle), the fuselage (e.g., the body of the robot) is tilted, the target axis angular velocity is positive, the target axis acceleration is positive, the target axis angular acceleration is positive, and the pitch is positive.

In this setting, in one example, the target axis angular velocity and the robot body pitch need to be greater than or equal to the corresponding recognition threshold at the same time, or close to the same time, before determining that the robot has touched the threshold-type obstacle. In one example, the preset time may be set to one second, and when the target axis angular velocity and the pitch of the robot's body are both greater than or equal to the corresponding recognition threshold value within one second, it is determined that the robot has touched the threshold-type obstacle.

In one example, the target axis acceleration and the pitch of the robot's body need to be greater than or equal to the corresponding recognition threshold at the same time, or close to the same time, before determining that the robot has touched the threshold-type obstacle. In one example, the preset time can be set to one second, and when the target axis acceleration and the pitch of the robot's body are both greater than or equal to the corresponding recognition threshold value within one second, it is determined that the robot has touched the threshold-type obstacle.

In one example, the target axis angular acceleration, and the pitch of the robot's body need to be greater than or equal to the corresponding identification threshold at the same time, or near the same time, before determining that the robot has touched the threshold-type obstacle. In one example, the preset time can be set to one second, and when the target axis angular acceleration and the pitch of the robot's body both reach the recognition threshold value greater than or equal to the recognition threshold value within one second, it is determined that the robot has touched the threshold-type obstacle.

In one example, the target axis angular velocity, the target axis acceleration, and the pitch of the robot's body need to be greater than or equal to the corresponding threshold recognition value at the same time, or close to the same time, before determining that the robot has touched the threshold-type obstacle. In one example, a preset time may be set to one second, and when the target axis angular velocity, the target axis acceleration, and the pitch of the robot body pitch are all greater than or equal to the corresponding threshold recognition value within one second, it is determined that the robot has touched the threshold-type obstacle.

In one example, the target axis angular velocity, the target axis angular acceleration, and the pitch of the robot's body need to be greater than or equal to the corresponding threshold recognition value at the same time, or close to the same time, before determining that the robot has touched the threshold-type obstacle. In one example, the preset time may be set to one second, and when the target axis angular velocity, the target axis angular acceleration, and pitch of the robot's body are all greater than or equal to the corresponding threshold recognition value within one second, it is determined that the robot has touched the threshold-type obstacle.

In one example, the target axis angular velocity, the target axis acceleration, the target axis angular acceleration, and the pitch of the robot's body need to be simultaneously, or nearly simultaneously, greater than or equal to the corresponding threshold identification threshold before determining that the robot has touched the threshold obstacle. In one example, the preset time may be set to one second, and when the target axis angular velocity, the target axis acceleration, the target axis angular acceleration, and the pitch of the robot's body are all greater than or equal to the corresponding threshold recognition value within one second, it is determined that the robot has touched the threshold-type obstacle.

In this example, combining at least one of the target axis angular velocity, the target axis angular acceleration, and the target axis acceleration, and the pitch of the robot's body data, when at least one of the target axis angular velocity, the target axis angular acceleration, and the target axis acceleration, and the pitch of the robot's body all reach a corresponding threshold value for threshold recognition within a preset period of time, it is determined that the robot has touched a threshold-type obstacle. The method is able to improve the accuracy of threshold-type obstacle recognition by means of a time window algorithm.

Figure 4:
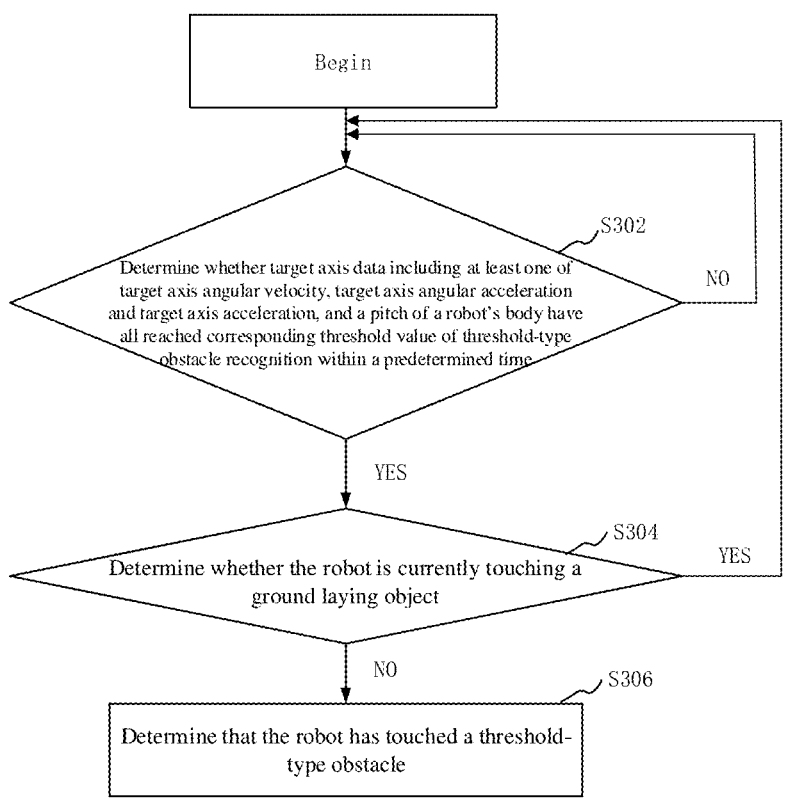
FIG. 4 is a flowchart illustrating a method for determining when a robot encounters a threshold in an example.

In another example, as shown in FIG. 4, identifying whether robot has touched a threshold type obstacle based on the change in at least one of target axis angular velocity, target axis angular acceleration, and target axis acceleration, as well as the change in the pitch of robot's body, comprises:

Step 302, determining whether target axis data including at least one of the target axis angular velocity, the target axis angular acceleration and the target axis acceleration, and the pitch of the robot's body have all reached the corresponding threshold value of the threshold-type identification within the predetermined time. If yes, step 304 is performed, if not, it is continuously judged whether at least one of the target axis angular velocity, target axis angular acceleration and the target axis acceleration, and the pitch of the robot's body have all reached the corresponding threshold recognition value within the preset time.

Step 304, determining whether the robot is currently touching a ground laying object. If not, step 306 is performed. if yes, it is continuously determined whether target axis data including at least one of the target axis angular velocity, the target axis angular acceleration and the target axis acceleration, and the pitch of the robot's body have all reached the corresponding threshold recognition value within a predetermined time.

Among other things, the ground laying obstacle refers to an object laid on the ground, and the ground laying obstacle may include a carpet, a floor mat, and the like. Ground laying obstacles can easily cause obstacles to the robot's travelling. When the robot passes through the ground laying obstacle in this case, the change characteristics of the data such as the target axis angular velocity, the target axis acceleration, the target axis angular acceleration, and the pitch of the body of the robot are very similar to those when passing through the threshold-type obstacle, so that if no distinction is made, and if the same passing strategy is adopted for the two types of obstacles, the effect of the robot's passing through will be affected. Exemplarily, for a threshold-type obstacle, the robot passage strategy adopted is accelerated passage. If a carpet is mistakenly recognized as a threshold-type obstacle, the robot will accelerate and sprint through the carpet, which on tone hand is not very aesthetically pleasing, and on the other hand, for a sweeping robot, the carpet will not be cleaned properly.

Therefore, when target axis data including at least one of the target axis angular velocity, the target axis angular acceleration, and the target axis acceleration, and the pitch of the robot body during the robot's moving process all reach the corresponding threshold recognition value of the threshold-type obstacle recognition within a predetermined time period, it is necessary to further differentiate whether or not the obstacle that has been touched is a ground laying object. Specifically, the judgement may be made using the collected data of the auxiliary sensors of the robot.

Among other things, the auxiliary sensors include, but are not limited to, a vision sensor, an infrared sensor, an ultrasonic sensor, and a lidar. For example, the vision sensor may be utilized for image acquisition to identify the type of obstacle. However, since the vision sensor is usually set at the top of the robot and is limited by the angle at which the machine can see the obstacle, the accuracy of the identification of the ground laying object using this method is unstable. Another example is that the ultrasonic sensor can be used to distinguish whether the type of obstacle is a sill or a ground laying object (e.g., a carpet). Ultrasonic sensors are usually set near the front gimbals of the robot and are capable of capturing ground information. Because ground laying obstacles and threshold-type obstacles have different intensity information, the intensity information returned by the ultrasonic sensor and filtered can distinguish whether an obstacle is a threshold-type obstacle or a ground laying obstacle.

Step 306 determines that the robot has touched a threshold-type obstacle.

When target axis data including at least one of the target axis angular velocity, the target axis angular acceleration, and the target axis acceleration of the robot during its movement, and the pitch of the robot body all reach a corresponding obstacle threshold value for threshold-type obstacle recognition within a predetermined time period, the robot can be accurately determined to have touched a threshold-type obstacle by excluding the case where the robot touches a ground laying obstacle, so as to improve the accuracy of the threshold-type obstacle recognition.

In another example after determining that the robot has touched the threshold-type obstacle, when target axis data including at least one of the target axis angular velocity, the target axis angular acceleration, and the target axis acceleration, as well as pitch of the robot's body have all reached a corresponding threshold-type obstacle signal off threshold for the threshold signal to be turned off within a preset period of time, it is determined that the robot has left the threshold-type obstacle.

Wherein the threshold-type obstacle signal off threshold is a critical value for further determining whether the robot leaves the threshold-type obstacle after the robot is judged to have touched the threshold-type obstacle. It is to be understood that for the three parameters of the target axis angular velocity, the target axis acceleration, the target axis angular acceleration, and the pitch of the robot body, the threshold value of the threshold-type signal off is set correspondingly. That is, the threshold-type obstacle signal off thresholds include a threshold-type obstacle signal off threshold for the target axis angular velocity, a threshold-type obstacle signal off threshold for the target axis angular acceleration, and a threshold-type obstacle signal off threshold for the pitch of the body of the robot. At least one of the target axis angular velocity, the target axis angular acceleration, and the target axis acceleration, as well as the pitch of the robot body need to simultaneously, or nearly simultaneously, reach the corresponding threshold-type obstacle signal off threshold before the robot is judged to have left the threshold-type obstacle.

In one example, the X-axis is set toward the front of the robot and the Y-axis is set toward the left of the robot, as viewed from the rear of the robot according to the sensor settings. In this case, the Y-axis is the rotation axis of the pitch, and the target axis is the Y-axis. When the front wheel of the robot gimbal leaves from the threshold-type obstacle, the pitch is positive, the angular acceleration of the target axis is positive, and the acceleration of the target axis and the angular velocity of the target axis are positive.

In this setting, in one implementation, the target axis angular velocity and the pitch of the robot body need to be simultaneously, or nearly simultaneously, greater than or equal to the corresponding recognition threshold before the robot is judged to have touched the threshold-type obstacle. And this is also consistent with the situation of the robot in the actual application process. In one example, the preset time can be set to one second, and when the target axis angular velocity and the pitch of the robot's body are both greater than or equal to the corresponding recognition threshold within one second, it is determined that the robot has touched the threshold-type obstacle.

In one example, the target axis acceleration and the pitch of the robot body need to be greater than or equal to the corresponding recognition thresholds at the same time, or close to the same time, before judging that the robot has touched a threshold-type obstacle. This is also consistent with the situation of the robot in the actual application process. In one example, the preset time can be set to one second, and when the target axis acceleration and the pitch of the robot body are both greater than or equal to the corresponding recognition threshold within one second, it is determined that the robot has touched the threshold-type obstacle.

In one example, the target axis angular acceleration and the pitch of the robot body need to be greater than or equal to the corresponding recognition threshold at the same time, or near the same time, before determining that the robot has touched the threshold-type obstacle. In one example, the preset time can be set to one second, and when the target axis angular acceleration and the pitch of the robot body are both greater than or equal to the corresponding threshold recognition value within one second, it is determined that the robot has touched the threshold-type obstacle.

In one example, the target axis angular velocity, the target axis angular acceleration, and the pitch of the robot body need to be greater than or equal to the corresponding threshold recognition value at the same time, or close to the same time, before determining that the robot has touched the threshold-type obstacle. In one example, the preset time may be set to one second, and when the target axis angular velocity, the target axis angular acceleration, and the pitch of the robot body are all greater than or equal to the corresponding threshold recognition value within one second, it is determined that the robot has touched the threshold-type obstacle.

In one example, the target axis angular velocity, the target axis acceleration, and the robot body pitch need to be greater than or equal to the corresponding threshold recognition value at the same time, or close to the same time, before determining that the robot has touched the threshold-type obstacle. In one example, a preset time may be set to one second, and when the target axis angular velocity, the target axis acceleration, and the pitch of the robot body are all greater than or equal to the corresponding threshold recognition value within one second, it is determined that the robot has touched the threshold-type obstacle.

In one example, the target axis angular velocity, the target axis angular acceleration, the target axis acceleration, and the pitch of the robot body need to be greater than or equal to the corresponding threshold recognition threshold at the same time, or near the same time, before determining that the robot has touched the threshold-type obstacle. In one example, the preset time may be set to one second, and when the target axis angular velocity, the target axis angular acceleration, the target axis acceleration, and the pitch of the robot body are all greater than or equal to the corresponding threshold recognition value within one second, it is determined that the robot has touched the threshold-type obstacle.

In one example, depending on the sensor setting, the X-axis may be set to the right side toward the robot and the Y-axis may be set to the front toward the robot when viewed from the rear of the robot. In this case, the X-axis is the rotation axis of the pitch and the target axis is the X-axis. When the front wheel of the robot gimbal departs from the threshold-type obstacle, the pitch is negative, the target axis angular acceleration is negative, the target axis acceleration is negative, and the target axis angular velocity is negative.

In this setting, in one implementation, the target axis angular velocity and the pitch of the robot body need to be simultaneously, or nearly simultaneously, less than or equal to the corresponding recognition threshold before determining that the robot has touched the threshold-type obstacle. In one example, the preset time can be set to one second, and when the target axis angular velocity and the pitch of the robot body are both less than or equal to the corresponding recognition threshold value within one second, it is determined that the robot has touched the threshold-type obstacle.

In one example, the target axis acceleration and the pitch of the robot body need to be simultaneously, or nearly simultaneously, less than or equal to the corresponding threshold recognition value before determining that the robot has touched the threshold-type obstacle. In one example, the preset time can be set to one second, and when the target axis acceleration and pitch of the robot body are both less than or equal to the corresponding threshold recognition value within one second, it is determined that the robot has touched the threshold-type obstacle.

In one example, the target axis angular acceleration, and the pitch of the robot body need to be simultaneously, or nearly simultaneously, less than or equal to the corresponding threshold recognition value before determining that the robot has touched the threshold-type obstacle. In one example, the preset time can be set to one second, and when the target axis angular acceleration and the pitch of the robot body both reach the threshold recognition value that is less than or equal to the threshold recognition value within one second, it is determined that the robot has touched the threshold-type obstacle.

In one example, the target axis angular velocity, the target axis angular acceleration, and the pitch of the robot body need to be simultaneously, or nearly simultaneously, less than or equal to the corresponding threshold recognition value before the robot is judged to have touched the threshold-type obstacle. In one example, the preset time may be set to one second, and when the target axis angular velocity, the target axis angular acceleration, and the pitch of the robot body are all less than or equal to the corresponding threshold recognition value within one second, it is determined that the robot has touched the threshold-type obstacle.

In one example, the target axis angular velocity, the target axis acceleration, and the pitch of the robot body need to be simultaneously, or nearly simultaneously, less than or equal to the corresponding threshold recognition value before the robot is judged to have touched the threshold-type obstacle. In one example, the preset time may be set to one second, and when the target axis angular velocity, the target axis acceleration, and the pitch of the robot body are all less than or equal to the corresponding threshold recognition value within one second, it is determined that the robot has touched the threshold-type obstacle.

In one example, the target axis angular velocity, the target axis angular acceleration, the target axis acceleration, and the pitch of the robot body need to be simultaneously, or nearly simultaneously, less than or equal to the corresponding threshold recognition value before the robot is judged to have touched the threshold-type obstacle. In one example, the preset time may be set to one second, and when the target axis angular velocity, the target axis angular acceleration, the target axis acceleration, and the pitch of the robot body are all less than or equal to the corresponding threshold recognition value within one second, it is determined that the robot has touched the threshold-type obstacle.

In this case, the robot leaving the threshold-type obstacle includes both cases of the robot moving forward through the threshold-type obstacle and the robot moving backward away from the threshold-type obstacle.

In this example, at least one of the target axis angular velocity, the target axis angular acceleration and the target axis acceleration, as well as the pitch of the robot body are fused, and the robot is determined to have left a threshold-type obstacle of the threshold-type when at least one of the target axis angular velocity, the target axis angular acceleration and the target axis acceleration, as well as the pitch of the robot body have all reached the corresponding threshold-type signal closure threshold within a preset time. The method is able to improve the accuracy of the threshold-type obstacle identification by means of a time window algorithm.

Using the above threshold-type obstacle recognition method, it can accurately identify whether the robot touches the threshold-type obstacle. After determining that the robot has touched the threshold-type obstacle, it is necessary to further address how to avoid accidental situations such as the robot getting stuck on the threshold bar or the threshold block when passing through the threshold-type obstacle, so as to improve the success rate of the robot's threshold-type obstacle passage. Taking a threshold-type obstacle as an example, when it is determined that the robot touches the threshold-type obstacle, there is a need to further address how to avoid accidental situations such as the robot getting stuck on the threshold when passing through the threshold, so as to improve the success rate of the robot passing through the threshold-type obstacle. To this end, the present application also provides a method for identifying the orientation of a threshold-type obstacle, illustrated as an example of the method being applied to the controller in FIG. 1, as shown in FIG. 5, comprising the following steps:

Step 402, clustering is performed based on the collected point cloud data to obtain a plurality of clustered point clouds.

Specifically, point cloud data may be collected using sensors configured by the robot. The sensors include, but are not limited to, infrared sensors, LiDAR, millimeter wave radar, and the like.

In one example, the robot is configured with a 360-degree single line lidar. The robot may acquire point cloud data collected by the LiDAR in real time, or when it is determined that the robot has touched a threshold-type obstacle. Based on the acquired point cloud data, a plurality of clustered point clouds are obtained by clustering based on distances between the point clouds, and clustering points with adjacent distances less than a certain threshold into a single class.

Wherein the plurality of clustered fetch point clouds belong to an environment related to the environment in which the threshold-type obstacle is located, and in a practical application, a plurality of clustered point clouds can be detected by the influence of the environment surrounding the threshold-type obstacle.

Figure 6:
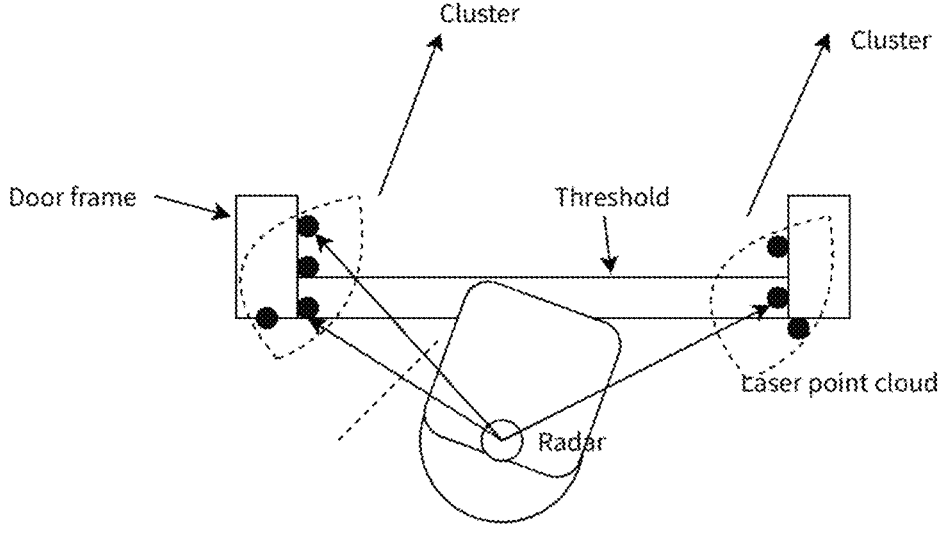
FIG. 6 is an explanatory schematic diagram of laser point cloud clustering in an example.

In connection with practical applications, it can be found that the obvious appearance characteristics of the vast majority of sill-type obstacles include that the sides of the sill-type obstacles are usually provided with frames. In this application scenario, the point cloud clustering results of one example are shown in FIG. 6, which is an example of a multi-class clustered point cloud obtained by clustering at the sill obstacle, which is a point cloud of the frame of the sill obstacle on the left side of the robot, and a point cloud of the frame of the sill obstacle on the right side of the robot, respectively.

Understandably, in practice, a wide range of clustered point clouds can be detected, influenced by the shape of the door body, and obstacles in the vicinity of the door body.

Among other things, the threshold-type obstacle identification method of the present application may be used to determine whether the robot has touched a threshold-type obstacle.

Step 404 determines, among the plurality of clustered point clouds, the clusters in which the at least two endpoints of the threshold-type obstacle are located.

Wherein the endpoints of the threshold-type obstacle are relative to the robot, if there is no obstacle in the vicinity of the threshold-type obstacle, the endpoints of the threshold-type obstacle are the endpoints of the boundaries of both sides of the threshold-type obstacle. If there is an obstacle in the vicinity of the threshold-type obstacle, at least one of the endpoints of the threshold-type obstacle is the intersection of the threshold-type obstacle with other obstacles.

Specifically, based on the characteristics of the sill-type obstacle endpoints, the clustered point cloud is further analyzed to determine the clusters in which the at least two sill-type obstacle endpoints are located. Wherein, since it is determined that the robot touches the threshold-type obstacle when at least one of the target axis angular velocity, the target axis angular acceleration, and the target axis acceleration, and the robot body pitch all reach the corresponding threshold-type identification threshold within a preset period of time during the walking process of the robot, the distance between the endpoints of the threshold-type obstacles and the preset position of the robot should be closer compared to the other point cloud data, and thus the distance between the endpoints of the threshold-type obstacles and the preset position of the robot can be determined based on the Therefore, the cluster where the endpoint of the threshold-type obstacle is located can be determined based on the distance between each cluster point cloud and the robot's preset position.

For example, the predetermined position may be a position where the robot touches a sill-type obstacle. In one example, the predetermined position may be a position of the front gimbal of the robot. That is, when the robot touches the threshold-type obstacle, the distance between the endpoint of the threshold-type obstacle and the location where the robot touches the threshold-type obstacle should be closer compared to other point cloud data. Thus, the cluster in which the sill obstacle endpoint is located can be determined based on the distance of each cluster point cloud from the location where the robot touched the sill obstacle.

Specifically, when at least one of the target axis angular velocity, the target axis angular acceleration and the target axis acceleration, as well as the pitch of the robot body reaches the corresponding threshold-type identification threshold in a predetermined period of time during the walking process, it is determined that the robot touches the threshold-type obstacle, and its corresponding robot operation scenario is that the robot's front wheels climb up the threshold-type obstacle, and at this time, the robot's front wheels are on the threshold-type obstacle. Then the distance between the endpoint of the threshold-type obstacle and the front wheel of the robot should be closer compared to other point cloud data, and therefore, the cluster where the endpoint of the threshold-type obstacle is located can be determined based on the distance between each clustered point cloud and the front wheel of the robot. In one example, at least two clusters of the clusters in which the point cloud connecting lines are closest to the front wheel of the robot may be determined as the clusters in which the endpoints of the threshold-type obstacles are located.

Taking the threshold-type obstacle as an example, when at least one of the target axis angular velocity, target axis angular acceleration and target axis acceleration, as well as the pitch of the robot's body in the process of movement all reached the corresponding threshold-type obstacle threshold recognition value within a preset time, it is determined that the robot climbs the threshold, and at this time, the robot's front wheel is on the threshold-type obstacle. Then the distance between the endpoint of the threshold-type obstacle and the front wheel of the robot should be closer compared to the other point cloud data, and therefore, the clusters in which the endpoints of the threshold-type obstacle are located can be determined based on the distance between the respective clustered point cloud and the front wheel of the robot. In one example, at least two clusters of the clusters in which the point cloud connecting lines are closest to the front wheel of the robot may be determined as the clusters in which the endpoints of the threshold-type obstacles are located.

Step 406 obtains a skeleton line of the sill obstacle based on the line that is closest to the predetermined position of the fuselage or the body of the robot among the lines of the clusters in which the at least two endpoints of the sill obstacle are located.

The skeleton line of a sill obstacle is the outline of the sill obstacle represented in the form of a line, and usually the skeleton line of a sill obstacle is orientated in the same direction as the length of the sill obstacle.

Wherein, after determining the clusters in which the endpoints of the sill obstacles are located, based on the connecting lines between the point clouds of the cluster in which the endpoints of the sill obstacles are located, the connecting line closest to the predetermined position of the fuselage is found to obtain the skeleton line of the sill obstacles.

Figure 7:
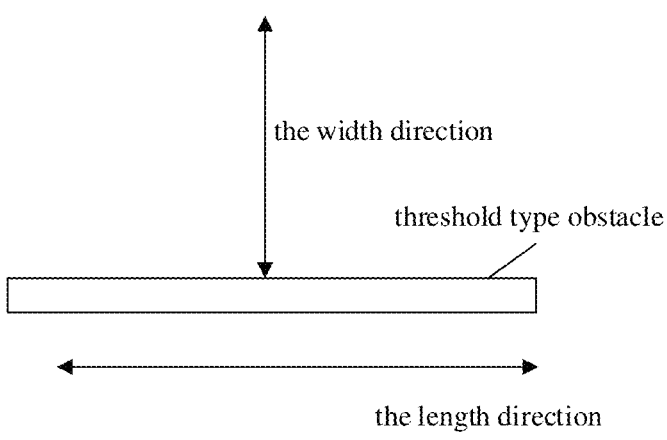
FIG. 7 is an explanatory schematic diagram of an orientation of a threshold-type obstacle in an example.

Step 408, determining the orientation of the sill obstacle based on the skeleton line of the sill obstacle.

Wherein the orientation of the sill-type barrier (e.g., sill obstacle) is perpendicular to the direction of extension of the sill-type barrier, indicating a direction in which the sill-type barrier is situated based on the direction of extension. In one example, the orientation of the sill-type barrier is in the same direction as the width of the sill-type barrier. In one example, a normal line of the skeleton line of the sill-type barrier may be used as the orientation of the sill-type barrier. As shown in FIG. 7, the skeleton line of the sill-type obstacle is aligned with the length direction of the sill-type obstacle, and a width direction perpendicular to the length direction is taken as the orientation of the sill-type obstacle.

The above-described result of identifying the orientation of the threshold-type obstacle is clustered based on the collected point cloud data, the clusters in which the endpoints of the threshold-type obstacle are located is determined according to the clustering result, a plurality of lines connecting the at least two endpoints of the threshold-type obstacle are determined in the clusters, the threshold-type obstacle skeleton line is obtained according to the a line selected from the plurality of lines, that is closest to the preset position of the body of the robot, and the threshold-type obstacle orientation is determined based on the skeleton line of the threshold-type obstacle. The method uses point cloud data to identify the threshold line, takes into account the relationship between the skeleton line of the threshold-type obstacle and the preset position of the robot, and the way of identifying the orientation of the threshold-type obstacle based on the skeleton line of the threshold-type obstacle is able to improve the accuracy of the identification of the orientation of the threshold-type obstacle.

In another example, when it is determined that the robot has touched a threshold-type obstacle, the collection of the point cloud data is triggered, i.e., when it is determined that the robot has touched a threshold-type obstacle, clustering is performed based on the collected point cloud data to obtain a plurality of clustered point clouds.

Wherein the predetermined position of the body is the position where the robot touches the endpoint of the threshold-type obstacle. Since the front wheel of the robot is in the state of climbing up the end point of the sill obstacle when it is recognized that the robot has touched the end point of the sill obstacle, at this time, the front wheel of the robot is on the sill obstacle, the front wheel of the robot can be used as the fuselage preset position, i.e., on the connecting line between the clouds of points of the clustering where the end point of the sill obstacle is situated, the connecting line closest (e.g., nearest) to the front wheel of the robot is found, and the skeleton line of the sill obstacle is obtained.

In the above-described result of identifying the orientation of the threshold-type obstacle, when it is determined that the robot touches the threshold-type obstacle, the point cloud data collected by the base is clustered, the cluster in which the endpoints of the resultant threshold-type obstacle are located is determined according to the clustering, and according to the connecting line closest to a predetermined position of the robot body in the cluster in which the endpoints of the threshold-type obstacle are located, a skeleton line of the threshold-type obstacle is obtained, and the direction of orientation of the threshold-type obstacle is determined according to the skeleton line of the threshold-type obstacle. The method uses LiDAR data to identify the threshold line, and considers the relationship between the skeleton line and the position at which the robot touches the threshold, and the way to identify the orientation of the threshold-type obstacle based on the skeleton line is able to improve the accuracy of the orientation identification of the threshold-type obstacle.

In another example, determining, among plurality of clustered point clouds, the clusters in which at least two endpoints of the sill obstacle are located, comprising: connecting the points closest to the preset position of the fuselage in the respective clustered point clouds in turn to obtain the connecting line between the respective clustered point clouds; determining a target connecting line closest to the preset position of the fuselage among the connecting lines between the respective clustered point clouds, and taking the two clusters in which endpoints of the target connecting line are located as clusters in which endpoints of the sill obstacle are located The two clusters where the endpoints of the target line are located are used as the clusters where the endpoints of the threshold-type obstacles are located.

Figure 8:
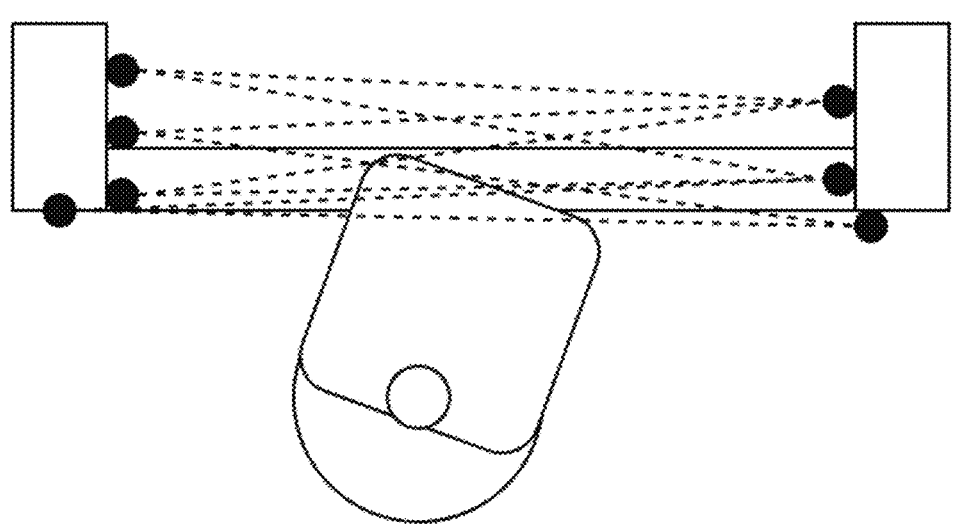
FIG. 8 is an explanatory schematic diagram of connecting lines of clustered point clouds in an example.

Wherein, using the predetermined position of the body as a reference, the cluster in which the endpoint of the threshold-type obstacle is located may be the cluster in which the endpoint with a smaller distance difference from the predetermined position of the body is located in the connecting line between the various clusters. Specifically, when the robot is detected to have touched the threshold-type obstacle, the cluster in which the endpoint of the threshold-type obstacle is located should be the cluster in which the endpoint of the closest link in the connecting line between the clusters is located to the position of the robot touching the threshold-type obstacle. In this regard, each point of each cluster can be connected in turn for searching, and in order to improve the searching efficiency, the closest point to the preset position of the robot in each cluster point cloud can also be found first, and then, as shown in FIG. 8, the closest points of all the classes can be connected to obtain the connecting line between the point clouds of the clusters, and then the closest connecting line to the preset position of the robot among the connecting lines between the clusters of the cloud can be found, and the cluster to which the endpoint of the connecting line pairs can be considered as the cluster of the threshold-type obstacle endpoint. cluster as the cluster where the endpoint of the obstacle in the threshold-type is located. Considering that the front wheel of the robot is in the state of climbing the threshold-type obstacle when the robot touches the threshold-type obstacle, the preset point of the robot can be the front wheel of the robot.

In this example, by connecting the points closest to the predetermined position of the machine body in each clustered point cloud in turn, and connecting the closest points of all the clusters to find the connecting line closest to the machine to find the clusters in which the endpoints of the sill obstacles are located, the positional characteristics of the robot touching the sill obstacles are taken into account, which can improve the accuracy of the finding of the clusters in which the endpoints of the sill obstacles are located.

In another example, obtaining a skeleton line of the sill obstacle according to the connecting line that is closest to the predetermined position of the fuselage among the connecting lines of the clusters in which the at least two endpoints of the sill obstacle are located, comprising: separately finding a plurality of candidate points that are closest to the predetermined position of the robot body in the clusters in which the endpoints of the respective sill obstacle are located; connecting the candidate points in the clusters in which the endpoints of the different sill obstacles are located, and obtaining a skeleton line of the sill obstacle based on the connecting lines of the respective candidate points The skeleton line of the sill-type obstacle is obtained by connecting each candidate point of the cluster where the endpoints of different sill-type obstacles are located, and according to the connecting line of each candidate point that is closest to the preset position of the airframe.

Figure 9:
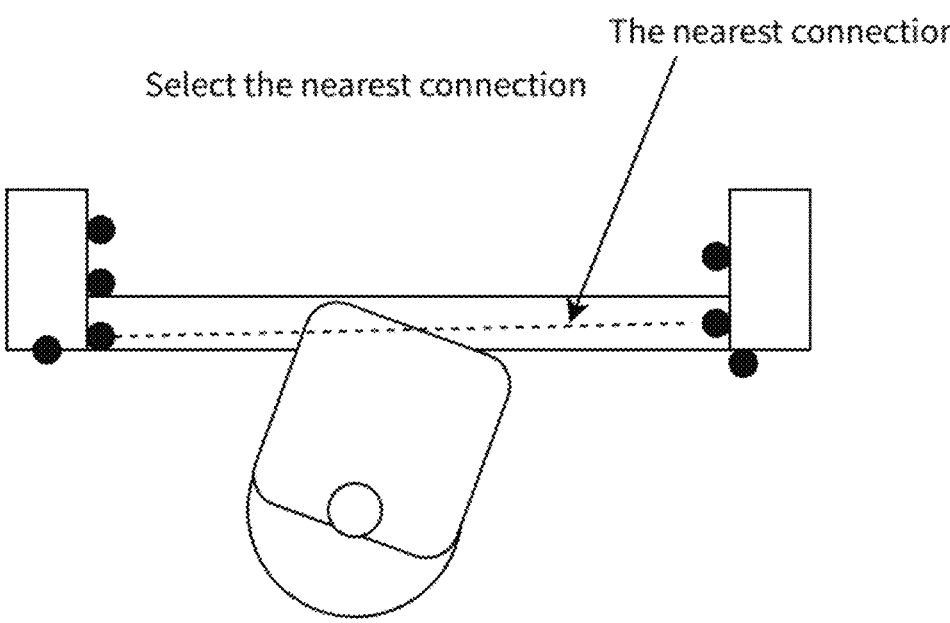
FIG. 9 is an explanatory schematic diagram of closest connecting lines in an example.

In this example, after determining the cluster in which the endpoints of the sill-type obstacles are located, a plurality of candidate points are further determined for the cluster in which the endpoints of the sill-type obstacles are located separately, and the candidate points may be the first N points in the cluster in which the endpoints of each sill-type obstacle are located which are closest to the preset position of the fuselage, e.g., the candidate points are the first 5 points in the cluster in which the endpoints of each sill-type obstacle are located which are closest to the preset position of the fuselage. Each candidate point in the cluster where the endpoints of the different sill-type obstacles are located is connected separately, and the connecting line of the plurality of candidate points in the cluster where the different endpoints of the sill-type obstacles are located is screened, and a connecting line which is closest to the predetermined position of the fuselage is selected, and this connecting line is used as a skeleton line of the sill-type obstacles. The skeleton line of the sill-type obstacle in one example is shown in FIG. 9.

In this example, on the basis of determining the clusters in which the endpoints of the sill-type obstacles are located, it is considered that the line connecting the points closest to the predetermined position of the fuselage in the cluster in which the endpoints of each sill-type obstacle are located is not necessarily the line closest to the fuselage. However, from the two clusters, a number of nearest points are selected for multiple connecting line screening respectively, which can select the line that is more in line with the skeleton line of the real sill obstacle, improve the accuracy of the skeleton line identification of the sill obstacle, and reduce the error.

In another example, determining the orientation of the sill obstacle based on skeleton line of the sill obstacle may be that the normal line of skeleton line of the sill obstacle is determined as the orientation of the sill obstacle. Specifically, the normal line of the skeleton line of the sill-type obstacle is a line perpendicular to the threshold line, and the door frame lines on both sides are usually perpendicular to the threshold line, so that the normal line of the skeleton line of the sill-type obstacle can be taken as the orientation of the sill-type obstacle.

Figure 10:
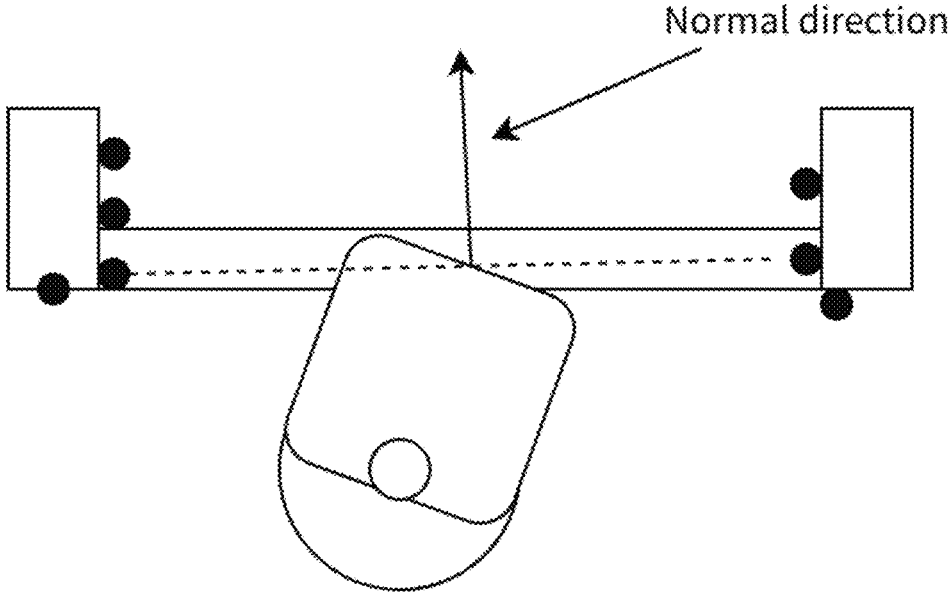
FIG. 10 is an explanatory schematic diagram of an orientation of a threshold-type obstacle in an example.

As shown in FIG. 10, the normal line of the skeleton line of the sill obstacle is taken as the orientation of the sill obstacle, and the orientation of the sill obstacle is the direction of reference for the subsequent passage of the machine through the sill obstacle.

Figure 11:
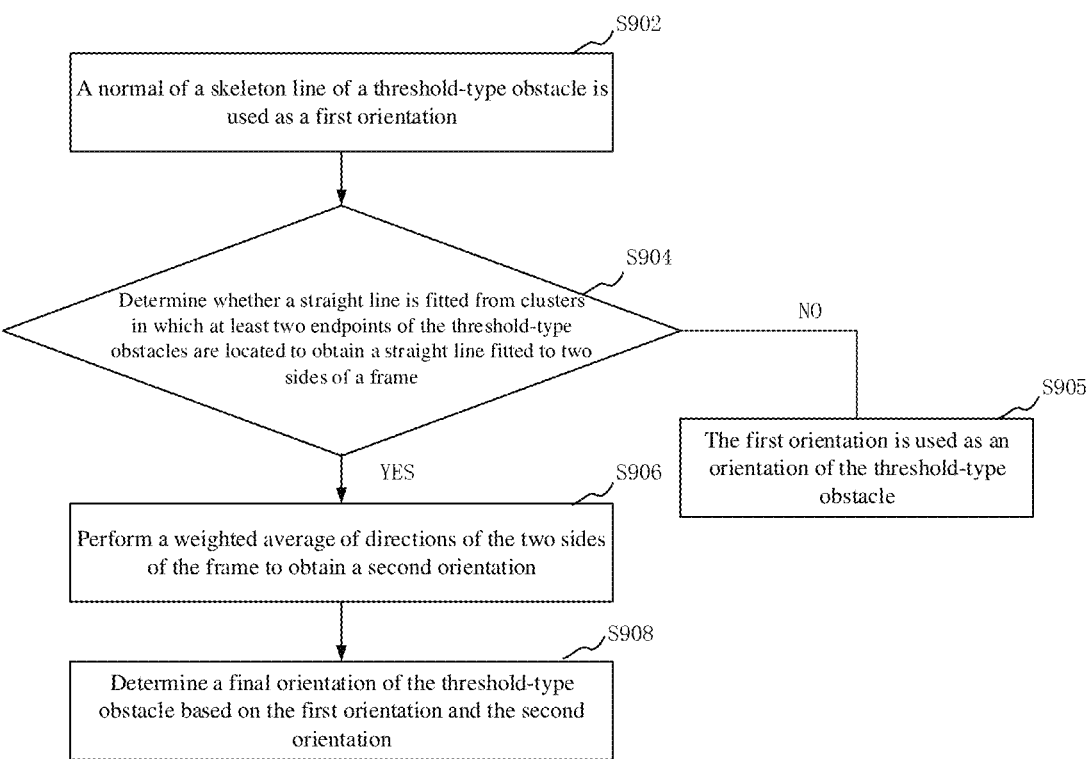
FIG. 11 is a flowchart illustrating a method of orientation recognition of threshold-type obstacles in another example.
Figure 12:
FIGS. 12 to 17 are explanatory schematic diagrams of linear fitting of clustered point clouds.
Figure 13:
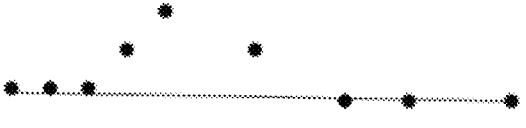
Figure 14:
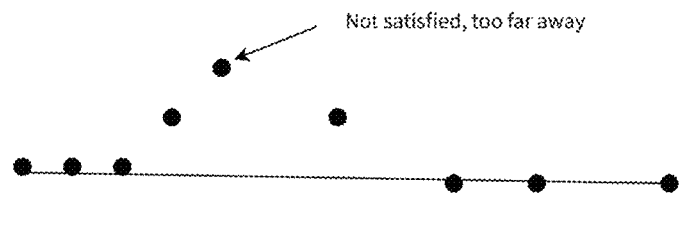
Figure 15:
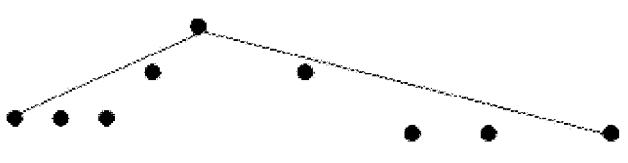
Figure 16:
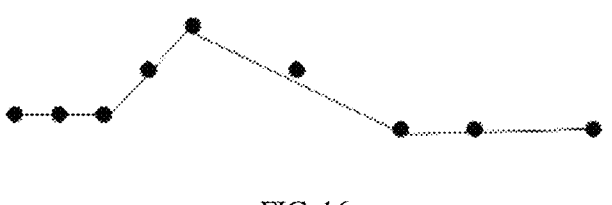
Figure 17:
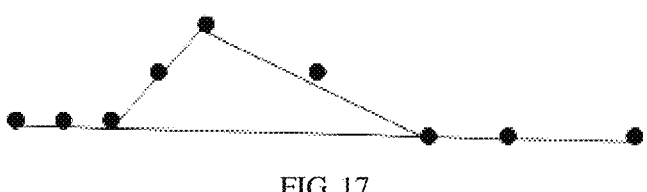

In order to improve the accuracy of the orientation recognition of the sill obstacle, the orientation of the sill obstacle is determined based on the skeleton line of the sill obstacle, as shown in FIG. 11, comprising:

At step 902, the normal line of the skeleton line of the sill type obstacle is used as the first orientation.

Specifically, the normal line of the skeleton line of the sill-type obstacle is a line perpendicular to the skeleton line of the sill-type obstacle, and the normal of the skeleton line of the sill-type obstacle is in the same direction as the width of the sill-type obstacle, which can characterize the orientation of the sill-type obstacle. Therefore, the normal of the skeleton line of a threshold-type obstacle can be taken as the orientation of the threshold-type obstacle.

Step 904, determines whether a straight line is fitted from the clusters in which the at least two endpoints of the obstacles of the at least two sill-type are located to obtain a straight line fitted to both sides of the frame. If no, step 905 is performed, and if yes, step 906 is performed.

In connection with practical applications, it can be found that the obvious appearance characteristics of the vast majority of the threshold-type obstacles include that the sides of the threshold-type obstacles are usually provided with frames, for example, the door frame is provided on both sides of the threshold-type obstacle, for example, the table and chair legs are provided on both sides of the connecting member at ground level, for example, the bed legs are provided on both sides of the connecting member at ground level. In this application scenario, the frames on both sides of the threshold-type obstacle are in a perpendicular relationship to the lengthwise direction of the threshold-type obstacle, and thus, the frames on both sides of the threshold-type obstacle can also be used to indicate the orientation of the threshold-type obstacle. In the case where the frames on both sides of the threshold-type obstacle are straight, the direction of the frames on both sides of the threshold-type obstacle is the direction in which the threshold-type obstacle is facing.

Based on this, in this example, a straight line is fitted to the clusters where the endpoints of the at least two sill obstacles are located using the appearance characteristics of the sill obstacles, and if a straight line can be fitted to obtain the two sides of the frames fitted to a straight line, the first orientation can be verified based on the two sides of the frames direction.

Specifically, if the clusters where the endpoints of the sill obstacles are located can be fitted to a straight line, it can be surmised that the clusters where the endpoints of the sill obstacles are located are the clusters where the frames on both sides are located, and the fitted straight line is the straight line fitted to the frames on both sides.

Specifically, a straight line is fitted to the clustered point cloud where the endpoints of the sill-type obstacles are located, respectively, and then a judgement is made as to whether or not a straight line is obtained for both sides of the frame fit. Specifically, the number of points needed for the straight line, the length of the straight line, and the distance from the farthest point on the straight line to the straight line can be set first to serve as the judgement condition for the straight line.

Specifically, the straight-line fitting algorithm is shown in FIGS. 12-17 and comprises the following steps:

Step 1, for the cluster in which the endpoints of the sill-type obstacles are located, a straight line is determined based on the endpoints of the clustered point cloud. Specifically, a line segment is determined by connecting the first and last points in the point cloud.

Step 2, calculating whether the distance from the farthest point to the straight line satisfies a threshold value. Specifically, it is determined whether the distance of the furthest point between the first and the last from this straight line is less than a threshold value.

Step 3, if not satisfied, divides the line into two segments from the farthest point. Specifically, if the farthest point is greater than this threshold value then this point is set as a dividing point dividing all points into two sets of points.

Step 4, Repeat steps 2 and 3 above for the split line segments until all the furthest points in the set of points satisfy the above rule.

Step 5, indirectly neighboring straight lines with similar slopes are connected to obtain the fitted straight line.

If more than one line is extracted then the longest line is selected as the extracted line.

The above fitting method can be used to fit a straight line from the clustered point cloud where the endpoints of the sill-type obstacles are located to get the two sides of the frame fit.

At step 905, the first orientation is used as the orientation of the sill type obstacle.

If the cluster where the endpoint of the sill obstacle is located is not able to be fitted to a straight line, it means that the sill obstacle does not have two sides of the frame, or the two sides of the frame are not straight (which may be the case of a cylinder). If the cluster where the endpoint of the sill obstacle is located cannot be fitted to a straight line, and since it is not possible to judge the real shape of the two side frames of the sill obstacle, it is not possible to extract accurate information about the orientation of the two side frames, then the normal line of the skeleton line of the sill obstacle (the first orientation) can be used as the orientation of the final sill obstacle.

Step 906, a weighted average of the orientations of the fitted straight lines of the frames on both sides is performed to obtain the second orientation.

Step 908 determines the orientation of the final sill obstacle based on the first orientation and the second orientation.

Specifically, for the sill-type obstacle endpoints where the clusters are respectively straight-line extraction to obtain the direction of the two straight lines as the two sides of the frame fitting straight line, the two sides of the frame fitting straight line weighted average can be obtained a direction, this direction as the second direction.

In this case, two ways can be used to calculate the orientation of the sill obstacle separately, and the two are corrected for each other to obtain the final desired orientation of a sill obstacle.

Taking the sill obstacle as an example, the orientation of the sill obstacle is the same as that of the door frame, and the door frame orientation can indicate the direction of the door frames of the sills on both sides. After determining the skeleton line of the threshold-type obstacle, the normal line of the skeleton line of the threshold-type obstacle can be taken as the orientation of the threshold-type obstacle. The orientation of the sill obstacle determined in this manner is affected by the shape of the door frame and the obstacle. In order to improve the accuracy of the orientation identification of the sill obstacle, the orientation identification result of the sill obstacle determined based on the clustering result is taken as a first orientation, and a second orientation may be further adopted in the second way of orientation identification of the sill obstacle to obtain a second orientation, and the first orientation is corrected using the second orientation to obtain an accurate orientation identification result of the sill obstacle.

In this example, by using two ways to calculate the orientation of the sill obstacle separately, and combining the orientation of the sill obstacle calculated by the two ways to determine the final orientation of the sill obstacle, the accuracy of the orientation detection of the sill obstacle can be improved.

In one example, when the difference between the first orientation and the second orientation is less than a threshold value, the second orientation is identified as the orientation of the final sill type obstacle. The predetermined value is a threshold value for identifying the proximity of the first orientation and the second orientation. For example, when the difference between the first orientation and the second orientation is less than 15 degrees, the second orientation is used as the door frame orientation.

Specifically, since the two side frames in the usual case are straight lines, when it is possible to obtain the two side frame fitting straight lines from the cluster fitting where the endpoints of the sill obstacle are located, which indicates that it is possible to extract the two side frames of the sill obstacle based on the point cloud data, the direction of the door frame determined on the basis of the two side frame fitting straight lines is more accurate, and at that time, the second orientation is determined as the orientation of the final sill obstacle. When it is not possible to obtain the straight line of the two sides of the frames fitted from the cluster fitting where the endpoints of the sill obstacle are located, the first orientation may be used as the orientation of the final sill obstacle. When the difference between the first orientation and the second orientation is greater than or equal to a threshold value, the first orientation may be used as the final orientation of the sill obstacle, or the clustering may be re-done based on the point cloud data of the laser ray and the calculation of the orientation of the sill obstacle may continue. In this example, by identifying the orientation of the sill-type obstacle, it is possible to provide a direction reference for passing the sill-type obstacle afterwards.

In this example, when the robot is recognized as touching a threshold-type obstacle during walking, the orientation of the threshold-type obstacle is further recognized, and the orientation of the threshold-type obstacle is used to provide direction guidance for passing the threshold-type obstacle.

Figure 18:
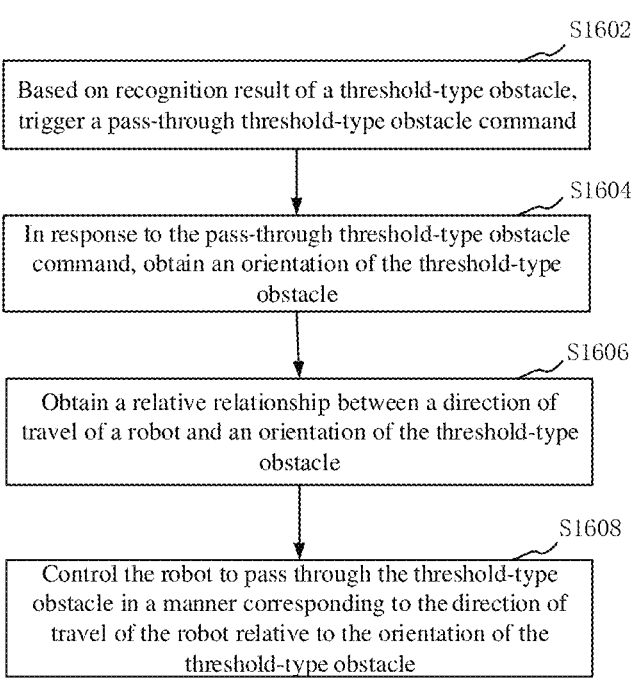
FIG. 18 is a flowchart illustrating a robot control method in an example.

In this regard, the success rate of the robot in passing the threshold-type obstacle is improved in order to avoid unforeseen situations such as the robot getting stuck in the threshold, getting trapped in the threshold-type obstacle, or skidding in the threshold-type obstacle while passing the threshold-type obstacle. The present application further provides a robot control method, as shown in FIG. 18, comprising the following steps:

Step 1602, based on the recognition result of the threshold-type obstacle, triggers a pass-through threshold-type obstacle command.

Specifically, when it is determined that the robot has touched the threshold-type obstacle, based on the identification result of the threshold-type obstacle, the pass-through-threshold-type obstacle command is triggered. Wherein, in order to avoid frequent triggering of the pass-through-threshold-type obstacle command, freeze processing of the pass-through-threshold-type obstacle command may also be performed after each triggering of the pass-through-threshold-type obstacle command. The freezing treatment of the pass-through-threshold-type obstacle command refers to setting a freezing time after each triggering of the pass-through-threshold-type obstacle command, so that the pass-through-threshold-type obstacle command can be triggered again only after exceeding the freezing time. Therein, the freezing time may be set according to the average time that the robot passes through the threshold-type obstacle, and the freezing time is set to be close to the average time that passes through the threshold-type obstacle or slightly greater than the average time that passes through the threshold-type obstacle. For example, if the average time for the robot to pass through the threshold-type obstacle is 2 seconds, the freezing time may be set to 2 seconds, or 3 seconds.

Wherein the recognition result of the threshold-type obstacle may be obtained by recognizing the image data based on the image data captured by the image sensor. The recognition result of the threshold-type obstacle is obtained by recognizing the image data, when the image data is recognized as including the threshold-type obstacle.

The recognition result of the threshold type obstacle can also be obtained by recognition based on the height data collected by the height sensor. The height difference is calculated using the height data at two consecutive times, and the recognition result of the threshold-type obstacle is obtained by comparing the height difference based on the height difference with a preset height difference of the threshold-type obstacle.

The identification result of the threshold-type obstacle can also be obtained by detecting the threshold-type obstacle using the threshold-type obstacle identification method of the present application.

Step 1604, in response to the pass-through-threshold-type obstacle command, obtains the orientation of the threshold-type obstacle.

Specifically, when the pass-through-threshold-type obstacle command is triggered, a predetermined orientation recognition method of the threshold-type obstacle is used to obtain the orientation of the threshold-type obstacle.

Wherein the method of recognizing the orientation of the sill type obstacle may be obtained by recognizing the image data collected based on the image sensor. By identifying the image data, when it is identified that the image data includes a threshold-type obstacle and frames on both sides of the threshold-type obstacle, a morphological method may be used to extract a skeleton line of the threshold-type obstacle and the frames on both sides, and the orientation of the threshold-type obstacle may be obtained based on the skeleton line of the threshold-type obstacle and the frames on both sides.

The method of identifying the orientation of the sill obstacle may also be determined using the method of identifying the orientation of the sill obstacle of the present application.

Step 1606, obtains a relative relationship between the direction of travel of the robot and the orientation of the sill obstacle.

Specifically, a relative relationship between the direction of travel of the robot and the orientation of the threshold type obstacle may be determined based on an angle of deviation of the direction of travel from the orientation of the threshold type obstacle. Wherein the direction of travel of the robot is a central axis of the robot body. Based on the angle of deviation of the direction of travel from the orientation of the threshold-type obstacle, the relative relationship between the direction of travel of the robot and the orientation of the threshold-type obstacle can be classified as: parallel, perpendicular, intersecting at a small angle, and intersecting at a large angle.

Specifically, when the angle of deviation of the direction of travel of the robot from the orientation of the threshold-type obstacle is 0, it indicates that the direction of travel of the robot is parallel to the orientation of the threshold-type obstacle. When the angle of deviation of the robot travelling direction from the orientation of the threshold-type obstacle is less than a preset threshold degree, it indicates that the robot travelling direction intersects the orientation of the threshold-type obstacle at a small angle. When the angular difference between the robot travelling direction and the orientation of the threshold-type obstacle is greater than the preset threshold value, it indicates that the robot travelling direction intersects the orientation of the threshold-type obstacle at a large angle. When the angle difference between the robot travelling direction and the orientation of the threshold type obstacle is 90 degrees, it indicates that the robot travelling direction and the orientation of the threshold type obstacle are perpendicular.

Step 1608 controls the robot to pass through the threshold-type obstacle in a manner corresponding to the passage of the threshold-type obstacle in relative relation.

Specifically, the relative relationship between the direction of travel of the robot and the orientation of the threshold-type obstacle determines the success rate of the robot in passing the threshold-type obstacle. When the direction of travel of the robot is parallel to the direction of the threshold-type obstacle, when the two wheels of the robot pass through the threshold-type obstacle almost simultaneously, there will be no situation in which the two wheels of the robot get stuck in the threshold-type obstacle, and the success rate of passing the threshold-type obstacle is high. When the deviation angle between the robot travelling direction and the orientation of the threshold-type obstacle is less than a preset threshold, the deviation between the robot travelling direction and the orientation of the threshold-type obstacle is smaller, and the probability of the wheels of the two sides of the robot getting stuck in the threshold-type obstacle is smaller, and the success rate of passing is higher. When the deviation angle between the robot's travelling direction and the orientation of the threshold-type obstacle is greater than a preset threshold, the deviation between the robot's travelling direction and the orientation of the threshold-type obstacle is larger, and if the threshold-type obstacle is wider and more slanted, there will be a situation in which the robot's side wheels are stuck on the side of the threshold-type obstacle, and the threshold-type obstacle has a low rate of success in passing through the obstacle.

Based on this, in the present example, different sill obstacle passage methods are set according to the relative relationship between the robot travelling direction and the orientation of the sill obstacle, and the robot is controlled to pass through the sill obstacle in the sill obstacle passage method corresponding to the relative relationship. For example, when the direction of travel of the robot is parallel to the orientation of the threshold-type obstacle, the robot can be controlled to pass through the threshold-type obstacle directly. When the robot's travelling direction deviates greatly from the direction of the threshold-type obstacle, the robot can be controlled to back up and adjust its travelling direction before passing the threshold-type obstacle.

In this example, using the recognition results of the threshold recognition and the recognition results of the orientation of the threshold-type obstacle, a corresponding way of passing the threshold-type obstacle is matched based on the relative relationship between the direction of travel of the robot and the orientation of the threshold-type obstacle. The method is capable of providing a matching threshold-type obstacle passage way for the robot to pass through the threshold-type obstacle using the orientation of the threshold-type obstacle as a guide, so as to improve the success rate of the robot in passing through the threshold-type obstacle.

In another example, the relative relationship between the direction of travel of the robot and the orientation of the threshold-type obstacle comprises: an angle of deviation of the direction of travel of the robot from the orientation of the threshold-type obstacle is greater than a first threshold value.

Wherein the first threshold value is a critical value of a deviation angle of the robot travelling direction from the orientation of the threshold-type obstacle when the robot passes the threshold-type obstacle safely based on an empirical setting. When the angle of deviation of the robot travelling direction from the orientation of the threshold-type obstacle is greater than the first threshold value, the deviation of the robot travelling direction from the orientation of the threshold-type obstacle is larger, the robot passes through the threshold-type obstacle diagonally, accidental situations such as the side wheels of the robot being stuck are prone to occur, and the passing rate of the robot passing through the threshold-type obstacle is low. In one example, the first threshold is set to 30 degrees based on experience.

At this time, the corresponding passing strategy for the threshold-type obstacle may be as follows: after controlling the robot to back up and adjusting the travelling direction of the robot according to the orientation of the threshold-type obstacle, increasing the motor speed of the driving wheel of the robot to a target speed, and controlling the robot to pass through the threshold-type obstacle at the target speed. That is, when the angle of deviation of the robot's travelling direction from the orientation of the threshold-type obstacle is greater than a first threshold, the robot is first controlled to back up, and after adjusting the robot's travelling direction, the motor speed of the robot's drive wheel is then increased to a target rotational speed, and the robot is controlled to pass through the threshold-type obstacle at the target rotational speed.

Specifically, controlling to increase the motor speeds of the left and right side wheels of the robot enables the right and right wheels to pass through sill-type obstacles at greater speeds.

Further, sprinting may be used to pass through the threshold-type obstacle. Sprinting is specified as controlling the motors of the left and right wheels to operate at a maximum rotational speed so that the robot sprints at a maximum speed and acceleration, thereby increasing the success rate of the robot in passing through the threshold-type obstacle.

In one example, the same target rotational speed may be set for all heights of thresholds, e.g., for all heights of threshold-type obstacles are sprinted at maximum speed and acceleration, thereby increasing the success rate of the robot in passing through the threshold-type obstacles.

In another example, different target rotational speeds may be set for different threshold-type obstacles. For example, different target rotational speeds are set for different types of threshold-type obstacles, and the target rotational speeds are determined by detecting the types of threshold-type obstacles, and different rotational speeds can be matched according to the different types of threshold-type obstacles, so that the matched target rotational speeds can be used to pass through the threshold-type obstacles when passing through the threshold-type obstacles, and the energy of the robot can be saved. The different types of threshold-type obstacles can be threshold-type obstacles made of different materials, such as thresholds made of different materials, or threshold-type obstacles that cannot be functional, such as thresholds, table and chair leg connectors on the ground.

In another example, different target rotational speeds may be set for different heights of threshold-type obstacles. By detecting the height of the threshold-type obstacle and determining the target rotational speed, different rotational speeds can be matched to different heights of the threshold-type obstacle, so that the threshold-type obstacle can be passed with the matched target rotational speed when passing through the threshold-type obstacle, which can save the energy of the robot.

Wherein, when the angle of deviation of the robot travelling direction from the orientation of the threshold-type obstacle is greater than the first threshold, the purpose of controlling the robot to back off is to adjust to facilitate adjustment of the robot travelling direction. Wherein, after controlling the robot to back up, the robot leaves the threshold-type obstacle and adjusts the robot travelling direction according to the orientation of the threshold-type obstacle. Wherein, the direction of travel of the robot can be adjusted to be parallel to the orientation of the threshold-type obstacle, or the angle between the two is less than a first threshold value, by means of rotation. After adjusting the travelling direction of the robot, the robot is controlled to perform a second sprint to accelerate through the threshold-type obstacle.

In this example, when the angle of deviation of the direction of travel of the robot from the orientation of the threshold-type obstacle deviates too much, the passage rate of the robot through the threshold-type obstacle can be improved by adopting the threshold-type obstacle passage method of backing up, rotating and adjusting the alignment of the orientation of the threshold-type obstacle and the second sprint.

In another example, the relative relationship between the direction of travel of the robot and the orientation of the threshold-type obstacle comprises: an angle of deviation of the direction of travel of the robot from the orientation of the threshold-type obstacle is less than or equal to the first threshold value. When the angle of deviation of the robot travelling direction from the orientation of the threshold-type obstacle is less than or equal to the first threshold value, the robot travelling direction deviates less from the orientation of the threshold-type obstacle, and at that time, the robot is controlled to accelerate through the threshold-type obstacle in the current travelling direction, e.g., the robot is controlled to directly perform a sprint to pass through the threshold-type obstacle.

Specifically, when the angle of deviation between the robot travelling direction and the orientation of the threshold-type obstacle is less than or equal to the first threshold value, the corresponding way of passing the threshold-type obstacle is as follows: increasing the motor speed of the drive wheel of the robot to a target speed, and controlling the robot to pass through the threshold-type obstacle at the target speed. In other words, when the angle of deviation between the direction of travel of the robot and the direction of the threshold-type obstacle is less than or equal to the first threshold value, there is no need to adjust the direction of travel of the robot, and the robot is directly controlled to pass through the threshold-type obstacle in a sprinting manner.

In this example, the success rate of passing the threshold-type obstacle can be improved by using different sprinting methods according to the angle of deviation of the direction of travel of the robot from the orientation of the threshold-type obstacle.

In another example, before passing the threshold-type obstacle and during passing the threshold-type obstacle, a prediction may also be made as to whether a collision will occur when the robot passes the threshold-type obstacle. If it is predicted that a collision will occur when the robot passes through the threshold-type obstacle, the robot is controlled to back up, and after adjusting a travelling direction of the robot according to the predicted location of occurrence of the collision and the orientation of the threshold-type obstacle, the motor speed of the drive wheel of the robot is increased to a target speed, and the robot is controlled to pass through the threshold-type obstacle at the target speed.

Specifically, based on the collected data of the multi-sensor, a prediction may be made as to whether a collision will occur when the robot passes through the threshold-type obstacle in the current travelling direction, and if a collision is predicted to occur when the robot passes through the threshold-type obstacle in the current travelling direction, the threshold-type obstacle passing method of backing up, adjusting the travelling direction, and sprinting a second time may be adopted, which is able to improve the success rate of the robot in passing through the threshold-type obstacle.

wherein the travelling direction is adjusted according to the position where the collision is predicted to occur and the orientation of the sill-type obstacle so that the angle of deviation between the adjusted travelling direction and the orientation of the sill-type obstacle is less than or equal to the first threshold value at the same time, so that a collision does not occur when the sill-type obstacle is passed according to the adjusted travelling direction and so that collision can be avoided during the secondary sprint, as well as avoiding a situation where the robot is caught on the sill-type obstacle in the course of sprinting. The situation.

In another example, when the robot is detected to slip while crossing the threshold-type obstacle, the robot is controlled to rotate after backing up a predetermined distance, increase the motor speed of the drive wheel of the robot to a target speed, and control the robot to pass through the threshold-type obstacle at the target speed.

Among other things, slippage is the occurrence of idling when the driving wheels of the robot operate without being able to generate sufficient power. Whether or not a robot is slipping can be determined based on the theoretical distance travelled by the robot in a preset time period versus the actual distance travelled. Slipping can occur because the ground is too smooth (e.g., water on the ground). When the robot is detected to slip when passing through a threshold-type obstacle, the robot is controlled to back up a preset distance and then rotate to adjust the travelling direction, thus adjusting the travelling path and accelerating through the threshold-type obstacle.

In this example the success rate of passing the threshold-type obstacle is improved by detecting whether the machine slips through the threshold-type obstacle, and when slipping is detected, it will back up to adjust the orientation and make a second sprint.

In another example, upon detecting that the robot is trapped while passing through a threshold-type obstacle, the robot is controlled to rotate in place and, upon detecting extrication, increase the motor speed of the drive wheels of the robot to a target speed and control the robot to pass through the threshold-type obstacle at the target speed.

A trapped robot is one that is in an environment where it cannot walk, such as being entangled in an object and unable to walk, or entering a narrow area and unable to walk. By detecting whether trapping occurs when the machine passes through threshold-type obstacles, detecting trapping will control the machine to rotate in place to get out of trapping, and after detecting trapping, it will make a second sprint to improve the success rate of passing through threshold-type obstacles.

In another example, when it is determined that the robot has left the threshold-type obstacle, an end-of-thresholdobstacle-passing command is triggered; if the robot's travelling distance from the position where it touched the threshold-type obstacle to the current position has exceeded the preset distance, the robot is controlled to end the operation of the threshold-type obstacle-passing mode and to switch to the target operation mode.

Specifically, when at least one of the target axis angular velocity, the target axis angular acceleration, and the target axis acceleration, as well as the robot fuselage pitch all reaches a corresponding threshold for threshold-type signal closure within a predetermined time period, it is determined that the robot leaves the threshold-type obstacle. When the robot is determined to have left the threshold-type obstacle, a threshold-type obstacle passing end command is triggered. When the distance travelled by the robot from the position at which it touched the threshold-type obstacle to the current position has exceeded the preset distance, or when the delay time for triggering the threshold-type obstacle passing end command reaches the preset delay time, the robot is controlled to end the operation of the threshold-type obstacle passing mode and to switch to the target operation mode.

In this example, after triggering the threshold-type obstacle passing end command, the threshold-type obstacle passing way is not immediately ended, but the robot is allowed to go forward for a further distance by means of a distance judgement as well as a time delay to ensure that the position of the entire body is out of the threshold-type obstacle area. After triggering the threshold-type obstacle passing end command and confirming that the robot has completely left the threshold-type obstacle area through the delay strategy, the threshold-type obstacle passing mode is terminated and the robot is controlled to switch to the target operation mode.

In this case, the target run mode is related to the type of robot, and the task that the robot performs. In the case where the robot is a cleaning robot, for example, the target operation mode can be a map building operation mode or a cleaning mode. In the case where the robot is a logistics robot, for example, the target operation mode can be a delivery mode, a pickup mode, and so on.

Specifically, after triggering the threshold-type obstacle passing end command, it can determine whether the position from which the threshold-type obstacle was touched at the beginning has moved forward by more than a preset distance (e.g., a distance of one fuselage), and if it has exceeded the distance, then it ends the operation of the threshold-type obstacle passing mode and switches to the target operation mode, which can spatially ensure that it completely passes the threshold-type obstacle before switching to the operation mode to avoid that the robot's rear wheels are still on the threshold-type obstacle when performing other actions such as rotating in place that cause the machine to be trapped. This can ensure that the robot can pass through the threshold-type obstacle completely before switching the operation mode, avoiding the robot being trapped by other actions such as rotating in place when the rear wheels are still on the threshold-type obstacle.

Specifically, after triggering the threshold-type obstacle passing end command, the threshold-type obstacle passing method can be stopped with a delay, and the robot can be controlled to continue to run the threshold-type obstacle passing method within a preset delay time, so that the robot can move forward for a certain distance when it detects that it has left the threshold-type obstacle to ensure that the position of the entire fuselage is out of the threshold-type obstacle area, and end the operation of the threshold-type obstacle after the preset delay time has expired. After the preset delay time expires, end the running of threshold-type obstacle and switch to the target running mode, which can ensure that the running mode is switched only after completely passing the threshold-type obstacle in time, avoiding that the robot is trapped by carrying out other actions, such as rotating in place, while the rear wheels of the robot are still on the threshold-type obstacle. Among other things, the preset delay time can be set based on experience, such as can be set to 0.5 seconds.

In another example, the method of controlling the robot further comprises: recording a run length of threshold-type obstacle passage method; when run length exceeds a predetermined run length, controlling end of running threshold-type obstacle passage method and switching to a target run method.

Specifically, while the robot is running the threshold-type obstacle passing way, a running length of the threshold-type obstacle passing way is recorded by a timer, and when running length exceeds a preset running length, robot is controlled to end the running of threshold-type obstacle passing way and to switch to a target running way in order to end the running of the threshold-type obstacle passing way and to avoid a dead loop.

In another example, triggering the pass-through threshold-type obstacle command based on the recognition result of the threshold-type obstacle comprises: triggering the pass-through-threshold-type obstacle command when the robot is recognized as having touched the threshold-type obstacle if the time difference from the last time the pass-through-threshold-type obstacle command was triggered reaches a preset release time.

Specifically, when it is recognized that the robot has touched the threshold-type obstacle, if the time difference from the last triggering of the pass-through-threshold-type obstacle command reaches the preset release time, the pass-through-threshold-type obstacle command is triggered. If the time difference from the last triggering of the threshold touching command does not reach the lifting time, the monitoring is continued without immediately triggering the pass-through threshold-type obstacle command.

In this example, when the pass-through-threshold-type obstacle command is triggered, the freezing process is carried out using a freezing timer, and the significance of the freezing timer is that the pass-through-threshold-type obstacle will not be triggered frequently, and a freezing period will be carried out after the last trigger of the pass-through-threshold-type obstacle, during which the sensor conditions for the pass-through-threshold-type obstacle will be blocked even if the conditions for the pass-through-threshold-type obstacle are fulfilled.

Figure 19:
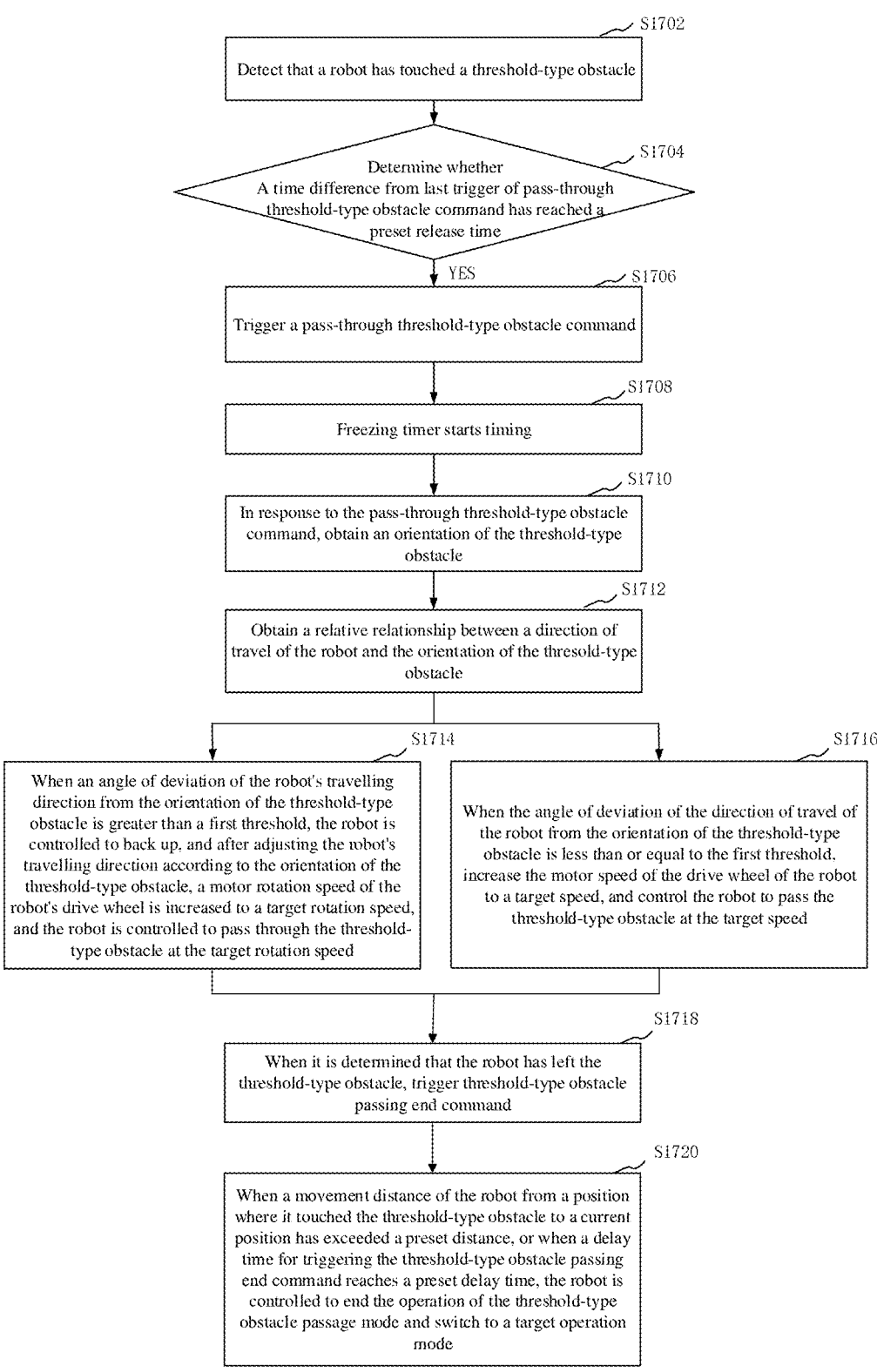
FIG. 19 is a flowchart illustrating a robot control method in another example.

In another example, a robot control method is provided, as shown in FIG. 19, comprising:

At step 1702, it is detected that the robot has touched a threshold-type obstacle.

Step 1704, determines whether the time difference from the last trigger of the command to pass through the threshold type obstacle has reached the preset release time. If so, step 1706 is performed.

Step 1706 triggers a pass through threshold-type obstacle command.

At step 1708, the freezing timer starts timing.

Step 1710, in response to the pass-through-threshold-type obstacle command, obtains the orientation of the threshold-type obstacle.

Step 1712, obtains a relative relationship between the direction of travel of the robot and the orientation of the sill obstacle.

At step 1714, when the angle of deviation of the robot's travelling direction from the orientation of the threshold-type obstacle is greater than a first threshold, the robot is controlled to back up, and after adjusting the robot's travelling direction according to the orientation of the threshold-type obstacle, the motor rotation speed of the robot's drive wheel is increased to a target rotation speed, and the robot is controlled to pass through the threshold-type obstacle at the target rotation speed.

Step 1716, when the angle of deviation of the direction of travel of the robot from the orientation of the threshold-type obstacle is less than or equal to the first threshold, increase the motor speed of the drive wheel of the robot to a target speed, and control the robot to pass through the threshold-type obstacle at the target speed.

Step 1718, when it is determined that the robot has left the threshold, triggers the threshold-type obstacle passing end command.

Step 1720, when the movement distance of the robot from the position where it touched the threshold-type obstacle to the current position has exceeded a preset distance, or when the delay time for triggering the end command for the passage of the threshold-type obstacle reaches a preset delay time, the robot is controlled to end the operation of the threshold-type obstacle passage mode and switch to the target operation mode.

The robot control method, which utilizes the threshold-type obstacle recognition results and the orientation recognition results of the threshold-type obstacle for the passage control of the threshold-type obstacle, is able to avoid blind sprinting when passing through the threshold-type obstacle, and improve the success rate of passing through the threshold-type obstacle.

Figure 20:
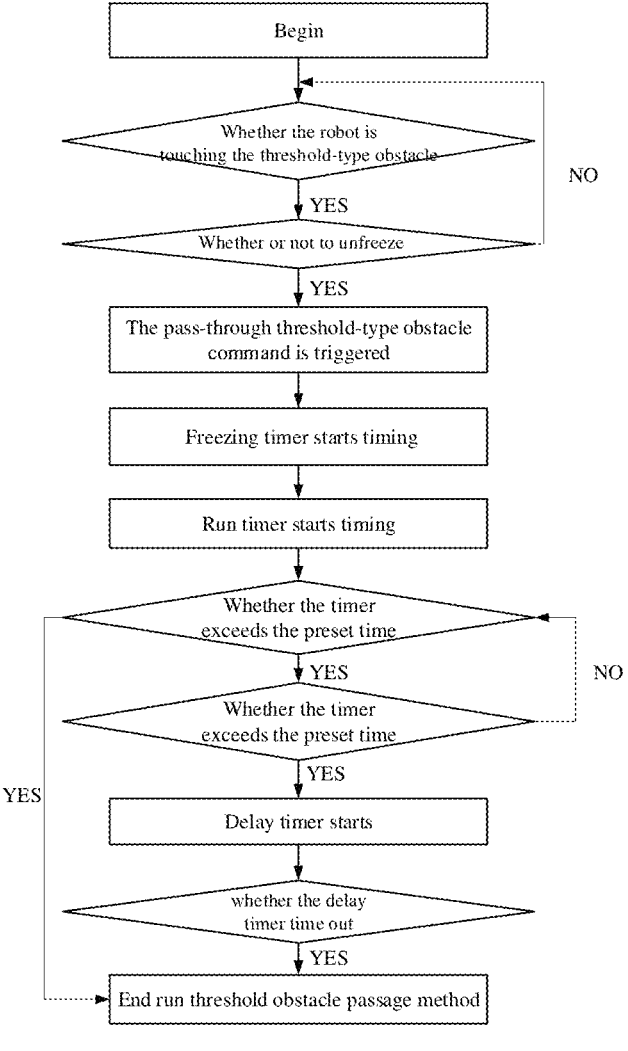
FIG. 20 is a flowchart illustrating a signal control when passing through threshold-type obstacles in an example.

In addition to the control strategies described above, the present application also ensures the success rate of passing through threshold-type obstacles and the safety of robot operation by means of signal control strategies. In particular, the signal processing involved in the robot control method is shown in FIG. 20. Signal processing is specifically a set of processing logic that transforms the signal of detecting a threshold-type obstacle into an action signal that notifies the drive device to perform the action of passing through the threshold-type obstacle. Simple signal processing is that when the signal to pass through the threshold-type obstacle is turned on, the action start signal for the threshold-type obstacle passing through is sent, and when the signal to pass through the threshold-type obstacle is turned off, the end signal for the threshold-type obstacle passing through is sent. In order to enhance the robustness of the algorithm, the examples of the present application include some mechanisms such as freezing, delay and timeout.

As shown in FIG. 20, when the robot is detected to have touched the pass-through threshold-type obstacle, it is judged whether the time difference from the last trigger of the pass-through threshold-type obstacle command reaches the preset release time, and if so, the pass-through threshold-type obstacle command is triggered. After each triggering of the pass-through-threshold-type obstacle command, a freezing period will be carried out, during which even if the sensor condition of the pass-through-threshold-type obstacle is satisfied, it will be blocked out and the pass-through-threshold-type obstacle command will not be triggered. If the freeze is lifted, the threshold command is triggered. With the freeze timer, the threshold command will not be triggered frequently.

After starting the threshold-type obstacle passage method, a run timer is used to record the run time of the threshold-type obstacle passage method, and the threshold-type obstacle passage method will be forcibly terminated after exceeding a certain period of time, so as to avoid a dead loop.

When it is determined that the robot is clear of the threshold-type obstacle, the End of Threshold-type obstacle Passage command is triggered to start the delay timer. The purpose of the delay timer is to move the machine forward a little more when it detects the threshold-type obstacle, to make sure that the entire body position is clear of the threshold-type obstacle area, and to prevent the machine from being trapped by performing other actions, such as spinning in place, while the rear wheels are still on the threshold-type obstacle. When the delay timer timeout, this time to end the operation of the sill obstacle through the way.

This example improves the success rate of the robot passing through threshold-type obstacles and robot safety by incorporating a signal control machine such as, for example, freeze, delay and timeout when controlling the robot to pass through threshold-type obstacles.

It should be understood that although the individual steps in the flowcharts involved in the examples as described above are shown sequentially as indicated by the arrows, these steps are not necessarily executed sequentially in the order indicated by the arrows. Unless expressly stated herein, there is no strict order limitation on the execution of these steps, and these steps may be executed in other orders. Moreover, at least a portion of the steps in the flowchart involved in the examples as described above may comprise multiple steps or multiple phases, which are not necessarily executed to completion at the same moment, but may be executed at different moments, and the order of execution of these steps or phases is not necessarily sequential, but may be performed in turn or alternately with at least a portion of the other steps or steps in the other steps. They may be performed in turn or alternately with other steps or with at least some of the steps or stages of other steps.

Based on the same inventive concept, the examples of the present application also provide a threshold-type obstacle recognition device for realizing the above-described threshold-type obstacle recognition method, a threshold-type obstacle orientation recognition device for realizing the above-described threshold-type obstacle orientation recognition method, and a robot control device for realizing the above-described robot control method. The solution to the problem provided by each device is similar to the solution documented in the above-described method, so the specific limitations in the examples of each device provided below can be found in the limitations of the method described above, and will not be repeated herein.

In one example, there is provided a threshold-type obstacle recognition device comprising:

An information acquisition module for obtaining target axis data including at least one of a target axis angular velocity, a target axis angular acceleration and a target axis acceleration of the robot during travelling, and a pitch of a robot body;

A control module for identifying whether or not the robot has touched a threshold-type obstacle based on the change in at least one of the target axis angular velocity, the target axis angular acceleration, and the target axis acceleration, as well as the change in the pitch of the robot body.

Specifically, a control module for determining that the robot has touched a threshold-type obstacle when at least one of the target axis angular velocity, the target axis angular acceleration, and the target axis acceleration, as well as the pitch of the robot body have all reached a corresponding threshold recognition threshold within a predetermined time.

In another example, the control module, is further used to determine that the robot has touched a threshold-type obstacle if it is determined that the robot is currently touching something other than a ground laying object, when target axis data including at least one of the target axis angular velocity, the target axis angular acceleration, and the target axis acceleration, as well as the pitch of the robot body, have all reached the corresponding threshold recognition threshold within a predetermined period of time.

In another example, the control module, is further used to determine that robot leaves threshold-type obstacle when target axis data including at least one of the target axis angular velocity, the target axis angular acceleration, and the target axis acceleration, as well as the pitch of the robot body, have all reached a corresponding threshold signal off value within a predetermined time.

In another example, an orientation recognition device for a sill type obstacle, comprising:

A clustering module for clustering based on the collected point cloud data to obtain a plurality of clustered point clouds;

A category finding module for determining, in a plurality of clustered point clouds, the clusters in which at least two endpoints of an obstacle in a threshold category are located;

A threshold line finding module for obtaining a skeleton line of a threshold-type obstacle based on the line closest to a predetermined position of the fuselage among the lines of the cluster in which at least two endpoints of threshold-type obstacle are located;

A door frame orientation analysis module for determining the orientation of a threshold-type obstacle based on a skeleton line of threshold-type obstacle.

In another example, a clustering module for clustering based on the collected point cloud data to obtain a plurality of clustered point clouds when it is determined that the robot has touched a threshold-type obstacle; a predetermined position of the robot body being a position at which the robot has touched the threshold-type obstacle.

In another example, a cluster finding module for sequentially connecting the points closest to the robot body preset position in each of the clustered point clouds to obtain a connecting line between each of clustered point clouds; determining a target connecting line closest to the robot body preset position in the connecting line between each of the clustered point clouds, and using the two clusters in which the endpoints of the target connecting line are located as the clusters in which endpoints of sill-type obstacles are located.

In another example, a threshold line finding module for separately finding a plurality of candidate points in the cluster in which each threshold-type obstacle endpoint is located that are closest to a predetermined position of the robot body; connecting each candidate point of the cluster in which different threshold-type obstacle endpoints are located separately, and obtaining a skeleton line of threshold-type obstacle based on the closest of the connecting lines of the connecting lines of each candidate point that are closest to a predetermined position of the robot body.

In another example, a door frame orientation analysis module for determining the normal line of the skeleton line of threshold-type obstacle as the orientation of the threshold-type obstacle.

In another example, a door frame orientation analysis module for determining the normal line of a skeleton line of sill obstacle as a first orientation; when a straight line of frame fit on both sides is obtained from a cluster where at least two endpoints of sill obstacle are located, performing a weighted average of the orientations of the straight line of frame fit on both sides to obtain a second orientation; and determining a final orientation of the sill obstacle based on the first orientation and the second orientation.

In another example, a doorframe orientation analysis module for determining second orientation as a final threshold-type obstacle orientation when the difference between the first orientation and the second orientation is less than a threshold.

In another example, a robot control device is provided comprising:

A command triggering module for triggering a pass-through-threshold-type obstacle command based on the recognition result of the threshold-type obstacle;

A door frame information acquisition module for obtaining the orientation of a threshold-type obstacle in response to the pass-through threshold-type obstacle command;

A relationship acquisition module for obtaining a relative relationship between the direction of travel of the robot and the orientation of the sill obstacle;

A control module for controlling a robot to pass through the threshold-type obstacle in a manner corresponding to the passage of threshold-type obstacle in the relative relationship.

In another example, a control module for controlling the robot to back up when the angle of deviation of a direction of travel of the robot from the orientation of the threshold-type obstacle is greater than a first threshold, and after adjusting the direction of travel of the robot in accordance with the orientation of threshold-type obstacle, increasing the motor speed of the drive wheels of robot to a target speed, controlling the robot to pass through threshold-type obstacle at the target speed.

In another example, a control module for, when the angle of deviation of the direction of travel of the robot from the orientation of threshold-type obstacle is less than or equal to a first threshold, increasing the motor speed of a drive wheel of the robot to a target speed, controlling robot to pass threshold-type obstacle at the target speed.

In another example, a control module for controlling the robot to back off if a collision is predicted to occur when the robot passes through the threshold-type obstacle, and for controlling the robot to pass through the threshold-type obstacle at the target speed by increasing the motor speed of the robot's drive wheels to a target speed after adjusting the robot's direction of travel based on the predicted location of the collision and the orientation of threshold-type obstacle. obstacle at the target speed.

In another example, a control module for triggering an end-of-threshold-obstacle-passing command when the robot is determined to have left the threshold-type obstacle; controlling the robot to end operation of threshold-obstacle-passing mode and switching to a target operation mode, when the robot's travelling distance from a position where the robot touched the threshold-type obstacle to a current position has exceeded a preset distance, or when the delay time for triggering end-of-threshold-obstacle-passing-through command reaches a preset delay time, to end the operation of threshold-type obstacle-passing mode and to switch to a target operation mode. In another example column, a control module for recording a running length of threshold-type obstacle passage operation; when running length exceeds a predetermined running length, controlling the robot to end running threshold-type obstacle passage operation and switch to a target running operation.

In another example column, a control module for controlling robot to back up a predetermined distance and then rotate when the robot is detected to be slipping through a threshold-type obstacle, increasing the motor speed of the drive wheels of robot to a target speed, and controlling the robot to pass through threshold-type obstacle at the target speed.

In another example column, a control module for controlling the robot to rotate in place when the robot is detected to be trapped while passing through a threshold-type obstacle and, upon detection that the robot is no longer trapped, increasing the motor speed of the robot's drive wheels to a target speed and controlling the robot to pass through the threshold-type obstacle at the target speed.

In another example column, a control module for triggering a pass-through-threshold-type obstacle command when the robot is recognized to have touched a threshold-type obstacle if the time difference from the last time the pass-through-threshold-type obstacle command was triggered reaches a predetermined release time.

The various modules in the above threshold recognition device, the threshold-type obstacle orientation recognition device, and the robot control device may be implemented in whole or in part by software, hardware, and combinations thereof. Each of the above-described modules may be embedded in or independent of a processor in the computer device in the form of hardware, or may be stored in a memory in the computer device in the form of software, so as to be invoked by the processor to perform operations corresponding to each of the above-described modules.

Figure 21:
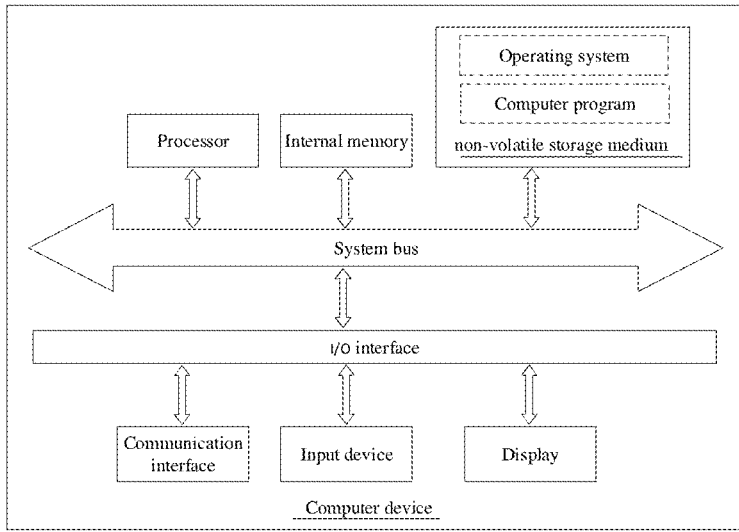
FIG. 21 is an internal structure diagram of a computer device in an example.

In one example, a robot is provided, the internal structure of which may be illustrated in FIG. 21. The computing device includes a processor connected via a system bus, a memory, a communication interface, a display and an input device. Wherein the processor of the computer device is used to provide computing and control capabilities. The memory of the computer device includes a non-volatile storage medium, an internal memory. The non-volatile storage medium stores an operating system and a computer program. The internal memory provides an environment for the operation of the operating system and the computer program in the non-volatile storage medium. The computer device has a communication interface for communicating with an external terminal in a wired or wireless manner, the wireless manner being realized via WIFI, mobile cellular networks, NFC (Near Field Communication) or other technologies. The computer program is executed by a processor to implement a threshold-type obstacle recognition method, a threshold-type obstacle orientation recognition method, and a robot control method. The display of the computer device may be a liquid crystal display or an e-ink display, and the input device of the computer device may be a touch layer covered on the display or a button, trackball, or touchpad provided on the housing of the computer device.

It will be appreciated by those skilled in the art that the structure illustrated in FIG. 21, which is only a block diagram of part of the structure relevant to the present application example, does not constitute a limitation on the computer apparatus to which the present application example is applied, and that the specific computer apparatus may comprise more or fewer components than those shown in the figures, or combine certain components, or have a different arrangement of components.

In one example, there is provided a robot comprising a memory and a processor, memory storing a computer programme, processor implementing the steps of the method of each of the above examples when executing computer programme.

In one example, there is provided a computer readable storage medium having stored thereon a computer programme, the computer programme being executed by a processor implementing the steps of the method of the above examples.

In one example, there is provided a computer program product comprising a computer program which, when executed by a processor, implements the steps of the method of each of the above examples.

A person of ordinary skill in the art may appreciate that achieving all or part of the processes in the methods of the above examples is possible by means of a computer programme to instruct the relevant hardware to do so, computer programme being storable in a non-volatile computer-readable storage medium, which computer programme, when executed, may comprise a process such as the processes of the examples of the respective methods described above. Among other things, any reference to a memory, database, or other medium used in the examples provided in this application may include at least one of non-volatile and volatile memory. Non-volatile memories may include Read-Only Memory (ROM), magnetic tape, floppy discs, flash memory, optical memory, high-density embedded non-volatile memories, Resistance-Resistive Memory (ReRAM), Magnetoresistive Random Access Memory (MRAM), Ferroelectric Memory (ReRAM), Magnetoresistive Random Access Memory (MRAM), Ferroelectric Random Access Memory (FRAM), Phase Change Memory (PCM), Graphene Memory and so on. The volatile memory may include a Random Access Memory (RAM) or an external cache memory, and the like. As an illustration and not as a limitation, the RAM may be in various forms, such as Static Random Access Memory (SRAM) or Dynamic Random Access Memory (DRAM), and the like. The databases involved in the examples provided in the present application may include at least one of a relational database and a non-relational database. The non-relational database may include a blockchain-based distributed database and the like, without limitation. The processor involved in the examples provided in the present application may be a general-purpose processor, a central processing unit, a graphics processor, a digital signal processor, a programmable logician, a data processing logician based on quantum computing, and the like, without limitation.

The technical features of the above examples may be combined in any combination, and all possible combinations of the technical features of each of the above examples have not been described for the sake of conciseness of description; however, as long as there is no contradiction in the combinations of these technical features, they should be considered to be within the scope of the present specification.

The above-described examples express only several examples of the present application, which are described in a more specific and detailed manner, but are not to be construed as a limitation of the scope of the patent of the present application. It should be pointed out that for a person of ordinary skill in the art, several deformations and improvements can be made without departing from the conception of the present application, which all fall within the scope of protection of the present application. Therefore, the scope of protection of the present application shall be subject to the appended claims.

The present application relates to a sill-type obstacle recognition method, an orientation recognition method of a sill-type obstacle, and a robot control method. With the robot control method of the present application, using the recognition results of the threshold-type obstacle and the recognition results of the orientation of the threshold-type obstacle, a corresponding way of passing the threshold-type obstacle is matched according to the relative relationship between the direction of travel of the robot and the orientation of the threshold-type obstacle, and the orientation of the threshold-type obstacle is used as a guide to provide the robot with a matching way of passing the threshold-type obstacle, so as to improve the success rate of the robot passing the threshold-type obstacle. obstacles, so as to improve the success rate of the robot in passing through the threshold-type obstacles.

What is claimed is:

1. A method of recognizing an orientation of a threshold-type obstacle, comprising:
clustering point cloud data to obtain a plurality of clustered point clouds;
determining clusters in which at least two endpoints of the threshold-type obstacle are located from the obtained plurality of clustered point clouds;
determining a plurality of lines connecting the at least two endpoints of the threshold-type obstacle in the clusters;
generating a skeleton line of the threshold-type obstacle by selecting the line that is closest to a predetermined position of a body of a robot from the plurality of lines;
determining at least one of a first orientation or a second orientation of the threshold-type obstacle, wherein:
the first orientation of the threshold-type obstacle comprises a normal line of the generated skeleton line of the threshold-type obstacle;
the second orientation of the threshold-type obstacle comprises a weighted average of directions of two side frame lines fitted from the determined clusters containing the at least two endpoints of the threshold-type obstacle; and
determining the orientation of the threshold-type obstacle based on the first orientation or the second orientation.

2. The method of claim 1, further comprising:
after determining that the robot touches the threshold-type obstacle, determining that a predetermined position of the body of the robot corresponds to a position where the robot touches the threshold-type obstacle.

3. The method of claim 1, wherein determining the clusters step comprises:
connecting points in each of the clustered point clouds that are closest to the predetermined position of the body of the robot to obtain a plurality of connecting lines between each of the clustered point clouds;
determining a target connecting line that is closest to the predetermined position of the body of the robot among the plurality of connecting lines; and
designating two clusters in which the at least two endpoints of the target connecting lines are located as the clusters in which the at least two endpoints of the threshold-type obstacle are located.

4. The method of claim 1, wherein generating the skeleton line step comprises:
determining candidate points in each cluster containing each endpoint of the threshold-type obstacle that are closest to the predetermined position of the body of the robot;

connecting the candidate points from clusters containing different endpoints of the threshold-type obstacle to generate connecting lines; and
obtaining the skeleton line of the threshold-type obstacle based on the connecting lines of the candidate points that are closest to the predetermined position of the body of the robot.

5. The method of claim 1, wherein determining the orientation step comprises one of:
establishing a final orientation of the threshold-type obstacle based on the first orientation; or
establishing the final orientation of the threshold-type obstacle based on the first orientation and the second orientation.

6. The method of claim 5, wherein establishing the final orientation step comprises:
designating the second orientation as the final orientation of the threshold-type obstacle after determining that a difference between the first orientation and the second orientation is less than a threshold value.

7. The method of claim 1, further comprising:
obtaining target axis data including at least one of a target axis angular velocity, a target axis angular acceleration and a target axis acceleration associated with the robot during its movement, a target axis being a rotation axis of a pitch of the body of the robot; and
identifying whether the robot has touched the threshold-type obstacle based on a change in the pitch of the body of the robot and a change in the obtained target axis data.

8. A robot control method comprising:
triggering a pass-through threshold-type obstacle command based on a recognition result of a threshold-type obstacle,
obtaining an orientation of the threshold-type obstacle in response to the pass-through threshold-type obstacle command;
obtaining a direction of travel of a robot relative to the orientation of the threshold-type obstacle;
after determining an angle of deviation of the direction of travel of the robot from the orientation of the threshold-type obstacle being greater than a first threshold value, adjusting the direction of travel of the robot according to the orientation of the threshold-type obstacle; and
controlling the robot to pass through the threshold-type obstacle based on the adjusted direction of travel of the robot relative to the orientation of the threshold-type obstacle.

9. The method of claim 8,
wherein controlling the robot step comprises:
controlling the robot to back up after determining that the angle of deviation is greater than the first threshold value;
increasing a motor rotational speed of a drive wheel of the robot to a target rotational speed after adjusting the direction of travel of the robot according to the orientation of the threshold-type obstacle; and
controlling the robot to pass through the threshold-type obstacle at the target rotational speed.

10. The method of claim 8, wherein controlling the robot step comprises:
after determining the angle of deviation of the direction of travel of the robot from the orientation of the threshold-type obstacle being less than or equal to the first threshold value, increasing a motor speed of a drive wheel of the robot to a target speed after determining that the angle of deviation is less than or equal to a first threshold; and controlling the robot to pass through the threshold-type obstacle at the target speed.

11. The method of claim 8, wherein controlling the robot step comprises:

controlling the robot to back up after predicting that a collision is to occur when the robot passes the threshold obstacle;

increasing a motor speed of a drive wheels of the robot to a target speed after adjusting the direction of travel of the robot according to a location where the collision is predicted to occur and the orientation of the threshold-type obstacle; and controlling the robot to pass through the threshold-type obstacle at the target speed.

12. The method of claim 8, wherein controlling the robot step is based on at least one of following first and second operations wherein:

the first operation includes:

triggering a threshold-type obstacle passing end command associated with the threshold-type obstacle after determining that the robot has left the threshold-type obstacle;

after determining that the robot has touched the threshold-type obstacle, controlling the robot to end an operation of an obstacle passing end mode and to switch to a target operation mode based on that:

a travelling distance of the robot from a position where it touched the threshold-type obstacle to a current position has exceeded a preset distance, or a delay time for triggering the threshold-type obstacle passing end command reaches a preset delay time; and the second operation includes:

recording a length of time that a threshold-type obstacle passage mode is in operation; and controlling the robot to end the threshold-type obstacle passage mode and switch to a target run mode after determining that a run length of the threshold-type obstacle passage mode exceeds a predetermined run length.

13. The method of claim 8, wherein controlling the robot step further comprises controlling the robot based on at least one of following first and second operations wherein:

the first operation includes:

controlling the robot to rotate after backing up a predetermined distance after detecting the robot slipping while passing through the threshold-type obstacle, increasing a motor speed of a drive wheel of the robot to a target speed, and controlling the robot to pass through the threshold-type obstacle at the target speed; and the second operation includes:

controlling the robot to rotate in place after detecting that the robot is trapped while passing through the threshold-type obstacle; and increasing the motor speed of the drive wheel of the robot to the target speed after detecting that the robot is no longer trapped, and controlling the robot to pass through the threshold-type obstacle at the target speed.

14. The robot control method according to claim 8, wherein triggering the pass-through threshold-type obstacle command step comprises:

triggering the pass-through threshold-type obstacle command after the robot is recognized as having touched the threshold-type obstacle, and after determining that a time difference from a current time and a last time the pass-through threshold-type obstacle command was triggered reaches a preset release time.

15. The method of claim 8, further comprising the step of obtaining the recognition result of the threshold-type obstacle by:

obtaining target axis data including at least one of a target axis angular velocity, a target axis angular acceleration and a target axis acceleration associated with the robot during its movement, a target axis being a rotation axis of a pitch of a body of the robot; and identifying whether the robot has touched the threshold-type obstacle based on a change in the pitch of the body of the robot and a change in the obtained target axis data.

16. The method of claim 8, wherein the obtaining the orientation step comprises:

clustering point cloud data to obtain a plurality of clustered point clouds;

determining clusters in which at least two endpoints of the threshold-type obstacle are located from the obtained plurality of clustered point clouds;

determining a plurality of lines connecting the at least two endpoints of the threshold-type obstacle in the clusters;

generating a skeleton line of the threshold-type obstacle by selecting the line that is closest to a predetermined position of a body of a robot from the plurality of lines; and determining the orientation of the threshold-type obstacle based on the skeleton line of the threshold-type obstacle.

17. An apparatus for controlling a robot, the apparatus comprising:

one or more processors, and memory having executable instructions that, when executed by the one or more processors, cause the apparatus to:

trigger a pass-through threshold-type obstacle command based on a recognition result of a threshold-type obstacle, obtain an orientation of the threshold-type obstacle in response to the pass-through threshold-type obstacle command;

obtain a direction of travel of the robot relative to the orientation of the threshold-type obstacle;

after determining an angle of deviation of the direction of travel of the robot from the orientation of the threshold-type obstacle being greater than a first threshold value, adjust the direction of travel of the robot according to the orientation of the threshold-type obstacle; and control the robot to pass through the threshold-type obstacle based on the adjusted direction of travel of the robot relative to the orientation of the threshold-type obstacle.

18. The apparatus of claim 17, wherein the instructions, when executed by the one or more processors, cause the apparatus to control the robot by:

controlling the robot to back up after determining that the angle of deviation is greater than the first threshold value;

increasing a motor rotational speed of a drive wheel of the robot to a target rotational speed after adjusting the direction of travel of the robot according to the orientation of the threshold-type obstacle; and controlling the robot to pass through the threshold-type obstacle at the target rotational speed.

19. The apparatus of claim 17, wherein the instructions, when executed by the one or more processors, cause the apparatus to control the robot by:

after determining the angle of deviation of the direction of travel of the robot from the orientation of the threshold-type obstacle being less than or equal to the first threshold value, increasing a motor speed of a drive wheel of the robot to a target speed after determining that the angle of deviation is less than or equal to a first threshold; and controlling the robot to pass through the threshold-type obstacle at the target speed.

20. The apparatus of claim 17, wherein the instructions, when executed by the one or more processors, cause the apparatus to control the robot by:

controlling the robot to back up after predicting that a collision is to occur when the robot passes the threshold obstacle;

increasing a motor speed of a drive wheels of the robot to a target speed after adjusting the direction of travel of the robot according to a location where the collision is predicted to occur and the orientation of the threshold-type obstacle; and controlling the robot to pass through the threshold-type obstacle at the target speed.

* * * * *